US012460742B2

(12) United States Patent
Flandin et al.

(10) Patent No.: US 12,460,742 B2
(45) Date of Patent: Nov. 4, 2025

(54) VALVE-DIAGNOSTIC SYSTEM AND DEVICE

(71) Applicant: General Technologies Corp., Delta (CA)

(72) Inventors: Daniel Edgardo Flandin, Surrey (CA); Nicholas Felix Flandin, Surrey (CA); Vitalii Roslov, New Westminster (CA)

(73) Assignee: GENERAL TECHNOLOGIES CORP., Delta (CA)

( * ) Notice: Subject to any disclaimer, the term of this patent is extended or adjusted under 35 U.S.C. 154(b) by 514 days.

(21) Appl. No.: 16/864,053

(22) Filed: Apr. 30, 2020

(65) Prior Publication Data

US 2020/0355295 A1  Nov. 12, 2020

Related U.S. Application Data

(63) Continuation of application No. PCT/CA2018/051368, filed on Oct. 29, 2018.

(60) Provisional application No. 62/580,375, filed on Nov. 1, 2017.

(51) Int. Cl.
*F16K 37/00* (2006.01)
*G01M 13/003* (2019.01)

(52) U.S. Cl.
CPC ....... *F16K 37/0008* (2013.01); *G01M 13/003* (2019.01); *F16K 37/0025* (2013.01)

(58) Field of Classification Search
CPC ............ F16K 37/0008; F16K 37/0025; G01M 13/003
See application file for complete search history.

(56) References Cited

U.S. PATENT DOCUMENTS

| | | | |
|---|---|---|---|
| 1,926,499 | A | 9/1933 | Ricardo |
| 2,868,181 | A | 1/1959 | Dolza |
| 3,567,135 | A | 3/1971 | Gebert |
| 4,141,243 | A | 2/1979 | Van Tassel et al. |
| 4,480,620 | A | 11/1984 | Tange et al. |
| 4,520,773 | A | 6/1985 | Koslow |
| 4,523,458 | A | 6/1985 | Daniel |

(Continued)

FOREIGN PATENT DOCUMENTS

| | | | |
|---|---|---|---|
| CN | 103308288 A | * | 9/2013 |
| JP | 2602799 B2 | * | 12/1990 |
| WO | 2009068052 | | 6/2009 |

OTHER PUBLICATIONS

Brochure of SDT270 Valve Testing Device available prior to Jun. 8, 2017.

*Primary Examiner* — Angelisa L. Hicks
(74) *Attorney, Agent, or Firm* — Todd A. Rattray; Oyen Wiggs Green & Mutala LLP

(57) ABSTRACT

A system for ascertaining operational status of an electrically-actuated valve comprises a valve-diagnostic device, which comprises: a mechanical sensor for detecting movement of a movable part of the electrically-actuated valve relative to a stationary part and outputting a mechanical sensor signal; and an electrical sensor for detecting an electrical characteristic associated with the operation of the electrically-actuated valve and outputting an electrical sensor signal. The system also comprises a data analyzer connected to the valve-diagnostic device to receive the mechanical sensor signal and the electrical sensor signal, and configured to display a corresponding output.

12 Claims, 11 Drawing Sheets

(56) References Cited

U.S. PATENT DOCUMENTS

| | | | |
|---|---|---|---|
| 4,542,649 A | | 9/1985 | Charbonneau et al. |
| 4,669,429 A | | 6/1987 | Nishida et al. |
| 4,805,451 A | | 2/1989 | Leon |
| 4,896,101 A | | 1/1990 | Cobb |
| 4,977,778 A | * | 12/1990 | Nafziger ................ G01S 15/88 |
| | | | 73/168 |
| 5,000,043 A | | 3/1991 | Bunch et al. |
| 5,086,273 A | * | 2/1992 | Leon ....................... G01B 7/14 |
| | | | 137/554 |
| 5,140,263 A | * | 8/1992 | Leon ................... F16K 37/0041 |
| | | | 137/554 |
| 5,329,465 A | | 7/1994 | Arcella et al. |
| 5,477,149 A | | 12/1995 | Spencer et al. |
| 5,524,484 A | | 6/1996 | Sullivan |
| 5,809,446 A | | 9/1998 | Visser |
| 6,668,633 B2 | | 12/2003 | Hart et al. |
| 6,889,705 B2 | | 5/2005 | Newman et al. |
| 7,405,917 B2 | | 7/2008 | Ahrens et al. |
| 7,533,563 B2 | | 5/2009 | Horak |
| 8,285,520 B2 | | 10/2012 | Desmet |
| 8,915,126 B2 | | 12/2014 | Friedmann et al. |
| 9,032,788 B2 | | 5/2015 | Methil-Sudhakaran et al. |
| 2002/0095986 A1 | | 7/2002 | Ito et al. |
| 2004/0145842 A1 | * | 7/2004 | Rice ........................ H02H 3/28 |
| | | | 361/42 |
| 2006/0101904 A1 | | 5/2006 | Brock |
| 2009/0048806 A1 | | 2/2009 | Nogami et al. |
| 2010/0256956 A1 | | 10/2010 | Desmet |
| 2020/0041035 A1 | * | 2/2020 | Huang .................... F16K 7/045 |

* cited by examiner

VALVE-DIAGNOSTIC SYSTEM AND DEVICE

CROSS REFERENCE TO RELATED PATENT APPLICATIONS

This application is a continuation of Patent Cooperation Treaty (PCT) application No. PCT/CA2018/051368 having an international filing date of 29 Oct. 2018, which in turn claims priority from (and the benefit under 35 USC § 119 in relation to) U.S. application No. 62/580,375 filed 1 Nov. 2017. All of the applications referred to in this paragraph are hereby incorporated herein by reference.

FIELD

This disclosure relates generally to systems and devices for diagnosing electromechanical actuators, and in particular to a multi-component sensor for testing electrically-operated or actuated valves.

BACKGROUND

Valves are devices useful for regulating fluid flow through passageways. A valve may comprise the following components: a body which defines a passageway facilitating fluid flow, a movable valve member movable relative to the body to obstruct or allow fluid flow, and an actuating mechanism for controlling movement of the movable valve member and thereby controlling fluid flow through the passageway. Different types of movable valve members can be used for different applications. For example, "needle valves" have movable valve members comprising needle-shaped plungers and are commonly used in fuel injection systems (e.g. in automotive applications) for delivering fuel from a pressurized fuel line to the intake manifold or cylinder of an engine.

An electrically-actuated valve or electrically-operated valve is used to describe a valve whose actuating mechanism is controllable using an electrical signal (typically from a programmable logic controller (PLC), or some other type of electronic control module (ECM), such as an engine control unit (ECU), powertrain control module (PCM), and/or the like). Electromechanical valves are an example category of electrically-actuated valves, which comprise electromechanical actuation mechanisms. A solenoid valve is an example of an electromechanical valve that relies on driving electric current through a solenoid to actuate an electromagnetic movable valve member, such as a core or plunger, to control fluid flow through a passageway.

Current methods and devices for characterizing electrically-actuated or operated valves include, for example: stethoscopes that listen for vibrations produced by the moving valve member; piezoelectric transducers that measure the intensity of mechanical impulses generated by the moving valve member; pressure sensors that detect fluid pressure fluctuations associated with the operation of the valve (e.g. the position of the movable valve member; and electrical sensors or electrical test instruments (e.g. oscilloscopes) that measure the electrical control signals being provided to the valve at the valve control input or that measure the electrical characteristics of the signal appearing across the solenoid of a solenoid-based valve. Each of these types of devices is generally used independently, and so provide important but incomplete information for diagnosing faulty valves. In addition, even where these sensors could be used on the same valve simultaneously, the information from separate sensors is unsynchronized.

For example, a particular voltage waveform observed on an oscilloscope can confirm that there is an electrical activity at the valve but is typically unable to confirm whether there is voltage at, or current through, the solenoid coil. Further, such oscilloscope waveforms do not provide any direct information on how the valve member responds to the input signal provided by the electronic control module at the valve input. As another example, piezoelectric transducers can detect movements of a valve member, but cannot provide timing information such as the delay between the time the solenoid is energized and the valve is opened, the delay between the time the solenoid is de-energized and the valve is closed, or the length of time that the fuel injector valve is opened.

Pressure sensors can be used to monitor fuel injector valve open times on certain types of fuel injection systems, such as high-pressure common rail fuel-injection systems, but require depressurization, bleeding, and mechanical connection to the injector fuel supply. Such sensors can be dangerous if not operated properly, demand considerable expertise, and require additional equipment to obtain the open and close times of a particular valve. Pressure sensors are not able to detect valve performance parameters on many fuel injection systems, including many non-common rail, or low-pressure common rail systems.

It is inconvenient and time consuming to use different sensor devices to collect different types of data. Synchronizing and/or analyzing data gathered from different types of sensor devices can be challenging, particularly to detect a faulty valve in real time, especially in the case of intermittent or infrequent faults. It can also be difficult to synchronize different types of sensor devices to measure electrical and mechanical signals associated with the valve simultaneously.

There is a general desire to identify defective electrically-actuated valves, such as electromechanical valves, solenoid valves, and piezoelectric valves, in situ—i.e. in the location where the valves are supposed to operate. There are also general desires to determine the cause of failure of such electrically-actuated valves with greater precision, in real time and without unduly long setup times.

SUMMARY

This invention has a number of aspects. These aspects may be combined, but may also be applied individually or in sub-combinations. These aspects include, without limitation:
  diagnostic devices for identifying faulty valves;
  devices for detecting one or a combination of mechanical motion and/or electromagnetic fields or signals at or near an electrically-actuated valve;
  systems and devices for characterizing electrically-actuated valves.

One example aspect provides a system comprising a valve-diagnostic device useful for detecting faults in an electrically actuated valve by sensing one or a combination of the following: movement of a movable part of the electrically actuated valve relative to a stationary part of the electrically actuated valve, acoustics associated with contact of the movable part with the stationary part of the electrically actuated valve, and electromagnetic fields emitted by an actuator actuating the electrically actuated valve. The valve-diagnostic device may comprise a mechanical motion sensor, an acoustic sensor, and an electromagnetic field sensor for achieving such purpose.

In some embodiments, a data analyzer may be connected to the valve-diagnostic device to receive at least one of a mechanical motion sensor signal, an acoustic sensor signal and the electromagnetic field sensor signal. The valve-diagnostic device may relay the sensor signals directly to the data analyzer or modify the sensor signals before transmitting them to the data analyzer. The data analyzer may comprise a computing device (e.g. personal computer, laptop) and/or other devices having a processor. The data analyzer may receive analog and/or digital signals from the valve-diagnostic device.

Another example aspect provides a system for characterizing electrically actuated valves by integrating multiple sensors into one device to eliminate the need of using multiple devices to test various characteristics of the valve. The set of sensors integrated in the device may comprise one or a combination of mechanical sensors, electric sensors, magnetic sensors, electromagnetic sensors, thermal sensors, and/or acoustic sensors. Each sensor can be a standalone component and/or built into the device. There can be more than one of each type of sensor within the device.

In some embodiments, the sensors can be connected to a data analyzer to allow for comparison and integrated analysis of sensor readings. The data analyzer can process sensor readings from different types of sensors (e.g. automatically) to determine various characteristics of the valve. The data analyzer may relay raw data to the user for further data processing and analysis. The data analyzer can optionally provide data to a user through a display.

A further example aspect provides diagnostic devices that facilitate simplified testing of electromechanical valves. The device allows a user to understand the operational performance of a fuel injector by placing it near or against the electromechanical valve of the fuel injector.

Some embodiments provide valve characterizing devices capable of combining raw and/or conditioned outputs of the device's sensors to reduce the number of connections between the device and a data analyzer. The device may comprise a mixer and/or modulator that receives signals from the device's various sensors and outputs a modified and/or integrated signal to the data analyzer. The device can minimize the number of cables required to transmit data to the data analyzer, reduce costs, and allow a simplified user interface to be adopted in relation to the data analyzer.

Some embodiments provide a valve-diagnostic device comprising different types of sensors, and multiple sensors for each type of sensor. The multiple sensors may, for example, comprise an array of sensors or multiple units of a type of sensor. For example, a valve characterizing device may comprise a primary electromagnetic field sensor and a secondary electromagnetic field sensor located on different parts of the device. The device itself and/or a data analyzer connected to the device may implement hardware and/or software methods to subtract the noise detected by the secondary sensor from the valve signal detected by the primary sensor to provide improved signal-to-noise ratio. The device may similarly comprise other types of primary and secondary sensors (e.g. mechanical, acoustical, etc.). Signals detected by the primary and secondary sensors can be transmitted to the data analyzer to determine comprehensive characterization metrics.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a valve-diagnostic device for collecting data from an electrically actuated valve. The valve-diagnostic device comprises a mechanical sensor and at least one electrical sensor. The valve-diagnostic device may be connected to a data analyzer which displays the data collected by the valve-diagnostic device. The valve-diagnostic device may be used to determine a condition of an electrically-actuated valve (for example, a valve in a vehicle engine) by simultaneously measuring mechanical and electrical signals produced by the valve.

One aspect of the invention provides a method for determining the condition of an electrically-actuated valve. A data analyzer may receive a mechanical sensor signal and an electrical sensor signal, determine an output based on the two signals, and display the output. The output may be a time delay value for the electrically-actuated valve determined from the mechanical sensor signal and the electrical sensor signal.

Figure 1:
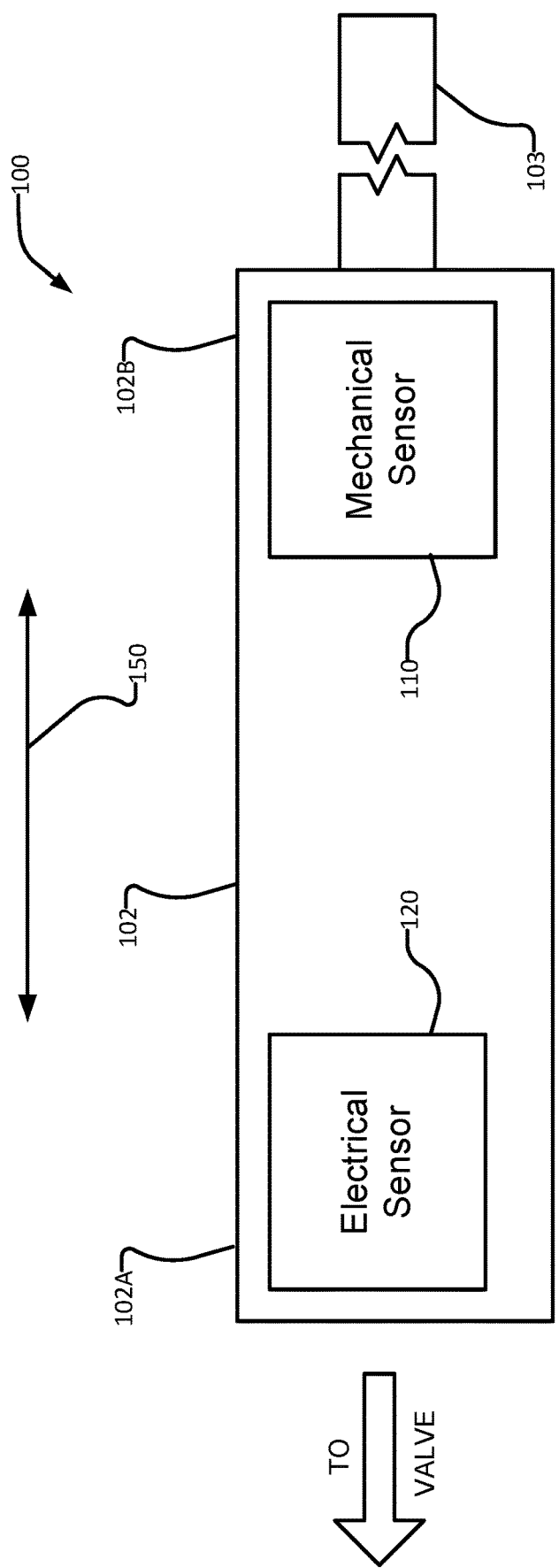
FIG. 1 is a schematic diagram of a valve-diagnostic device, according to one embodiment of the invention.
Figure 2:
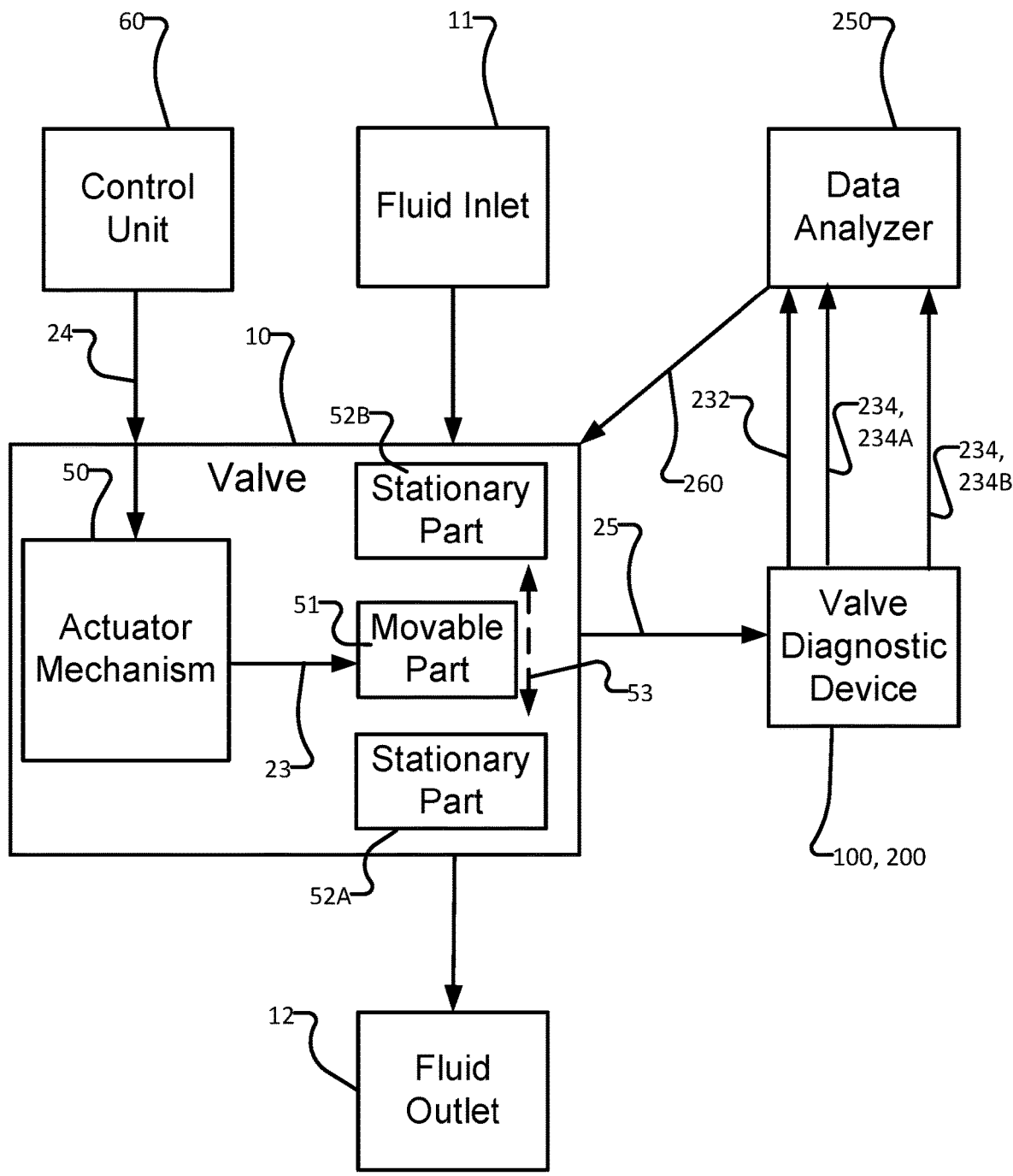
FIG. 2 is a schematic diagram of the interaction between the FIG. 1 (or FIG. 4) valve-diagnostic device, the electrically-actuated valve, and a data analyzer according to a particular embodiment.
Figure 9A:
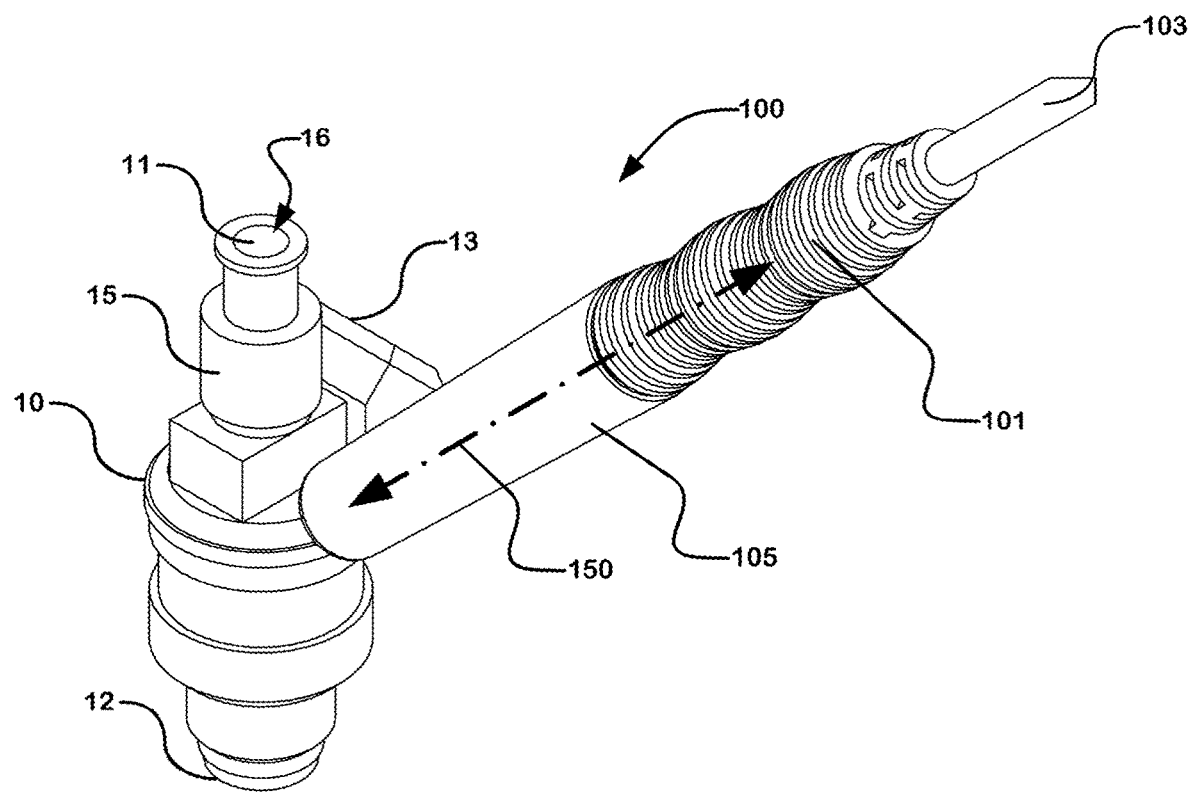
FIGS. 9A, 9B and 9C (collectively, FIG. 9) are perspective views of the valve-diagnostic device shown in FIG. 1 interacting with an electrically-actuated valve according to a particular embodiment.
Figure 9B:
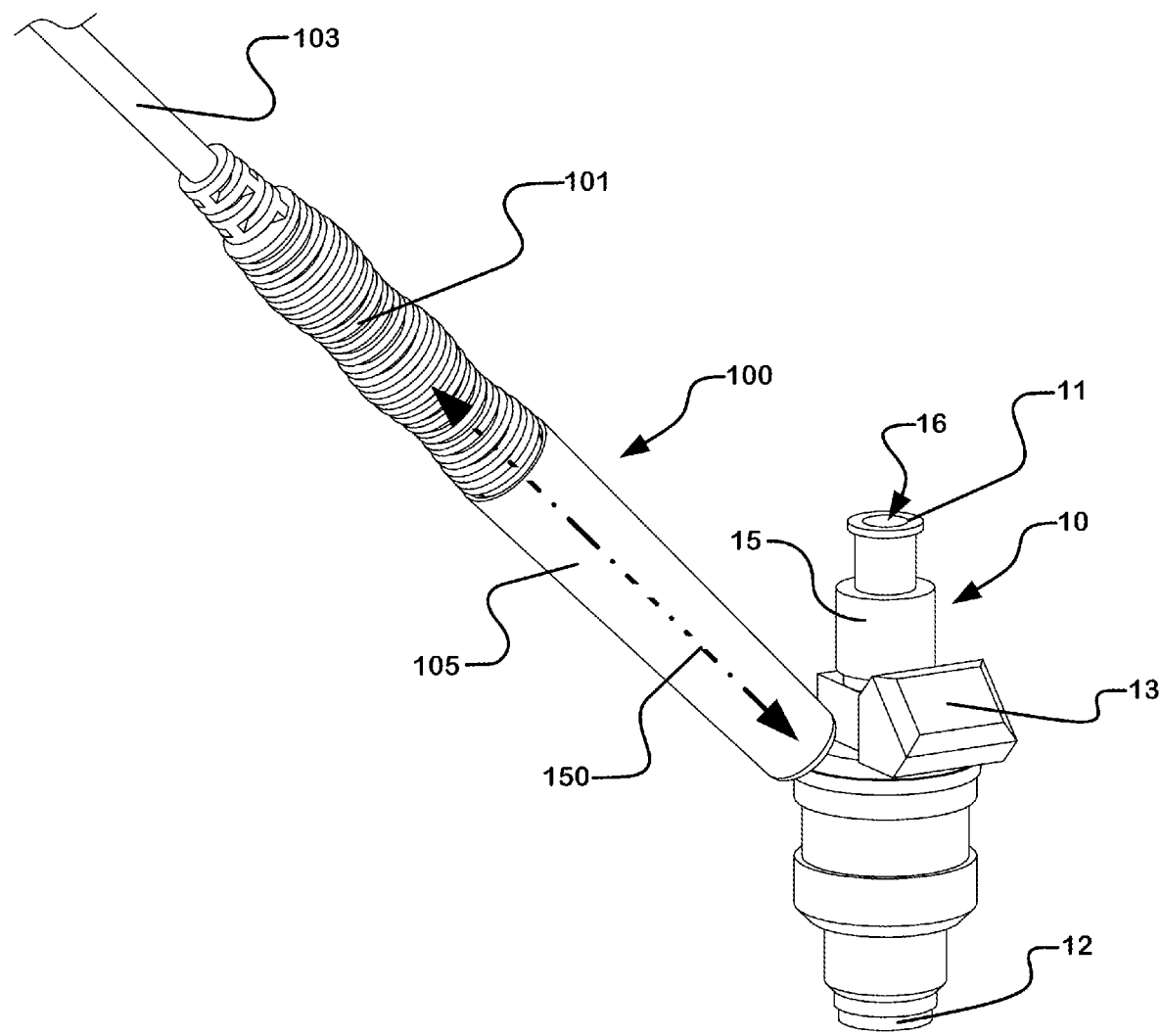

FIG. 1 is a schematic diagram of a valve-diagnostic device 100, according to one embodiment of the invention. FIG. 2 is a schematic diagram of the interaction between electrically-actuated valve 10, the FIG. 1 valve-diagnostic device 100, and a data analyzer 250. FIGS. 9A and 9B are perspective views of the FIG. 1 valve-diagnostic device 100 positioned to determine the condition of an electrically-actuated valve 10.

Valve-diagnostic device 100 of the FIG. 1 embodiment comprises a mechanical sensor 110 and at least one electrical sensor 120 housed in or on a body 102 (for example, a printed circuit board). Body 102 may comprise a suitable enclosure. Body 102 may be communicatively connected, via a cable 103 and/or wirelessly, to data analyzer 250. Alternatively, body 102 may communicate wirelessly with data analyzer 250. In some embodiments, data analyzer 250 and valve diagnostic device 100, 200 may be physically located (e.g. embodied) in the same enclosure, housing, casing and/or the like. In such embodiments, valve-diagnostic device 100, 200 may be "hard-wired" to data analyzer 250. As shown in FIG. 2, mechanical sensor 110 measures one or more physical phenomena associated with the movement of a moveable part 51 (e.g. a plunger or other movable valve member) of electrically-actuated valve 10 and generates a corresponding mechanical sensor signal 232 associated with such measurement. Mechanical sensor signal 232 is provided to data analyzer 250. Electrical sensor 120 measures one or more electrical (or electromagnetic) phenomena associated with the operation of electrically-actuated valve 10 and generates a corresponding electrical sensor signal 234 associated with such measurement. Electrical sensors may include sensors suitable for detecting properties of either or both of electric and magnetic fields. Electrical sensor signal 234 is provided to data analyzer 250.

Figure 9C:
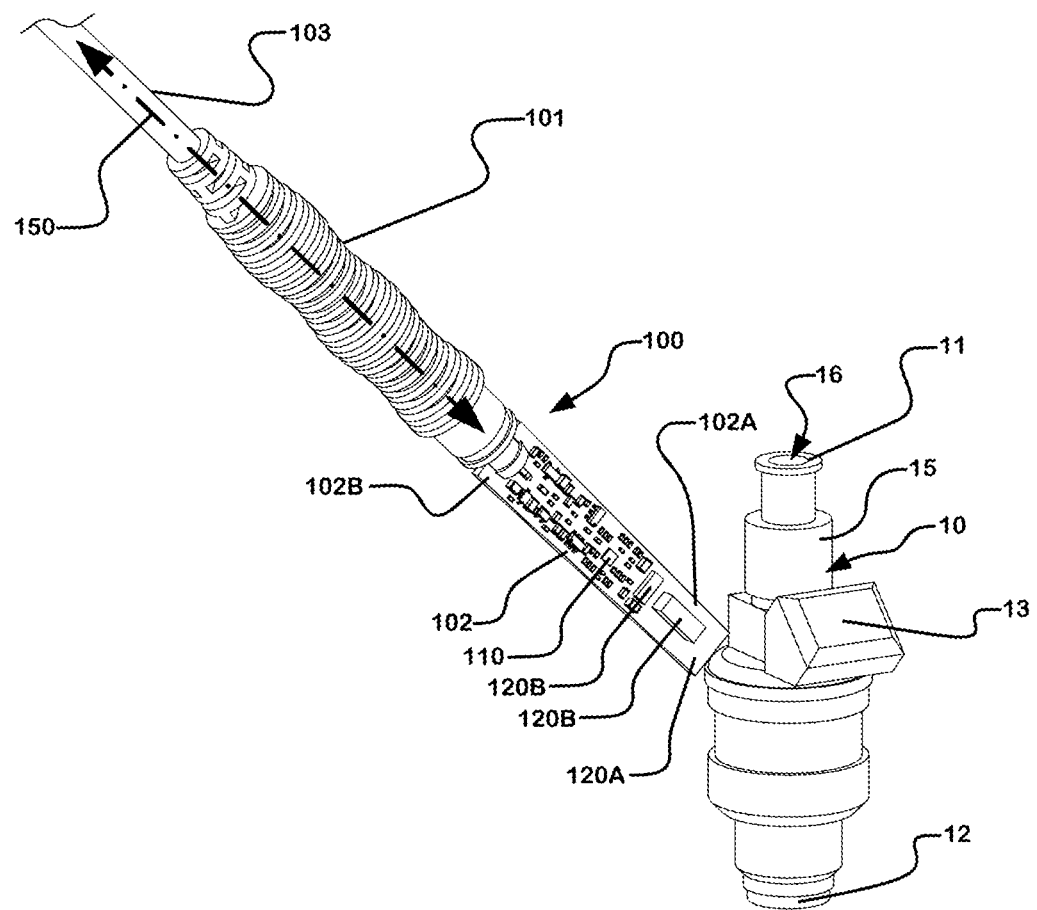

Referring to FIGS. 2 and 9, electrically-actuated valve 10 may be, for example, a valve on a vehicle engine to control flow of a fluid, for example fuel or oil to the engine (e.g. the valve in a fuel injection system). Electrically-actuated valve 10 of the example embodiment shown in FIGS. 2 and 9 comprises a fluid inlet 11, a fluid outlet 12, a body 15 that defines a passageway 16 facilitating fluid flow between fluid inlet 11 and fluid outlet 12, a movable part 51 that controls fluid flow through passageway 16, and an electrical control interface 13 for electrical connection of valve 10 to an electronic control unit 60.

Control unit 60 provides an electrical control signal 24 to valve 10 via control interface 13. Control signal 24 causes an actuator mechanism 50 of valve 10 to move movable part 51. By way of non-limiting example, actuator mechanism 50 may comprise a coil wrapped around a magnetic plunger. In some embodiments, moveable part 51 is provided by the magnetic plunger and control signal 24 may cause current to flow through the coil, thereby resulting in the application of magnetic force 23 to moveable part 51. In some embodiments, moveable part 51 is embodied separately from the magnetic plunger, in which case control signal 24 causing current to flow in the coil may result in the application of magnetic force to the plunger, which in turn may apply mechanical force 23 to moveable part 51.

Moving movable part 51 controls fluid flow through passageway 16. Movable part 51 may comprise, for example, a pintle or a plunger which opens and closes fluid inlet 11, fluid outlet 12 or any other part of passageway 16. Typically, valve 10 is "normally opened" or "normally closed". A normally closed valve 10 is configured such that moveable part 51 closes passageway 16 in the absence of control signal 24. A normally opened valve 10 is configured such that moveable part 51 opens passageway 16 in the absence of control signal 24. Valve 10 may comprise a suitable bias mechanism for biasing moveable part 51 toward its normally open/closed position. Such bias mechanisms may be provided as part of actuator mechanism 50 or may be separately embodied. When moveable part 51 returns to its normally open/closed position, moveable part 51 may contact a stationary part 52A of valve 10 (e.g. stationary part 52A may comprise a valve seat, some other part of valve body 15 and/or the like). As movable part 51 moves in response to force 23 (e.g. on the application of a suitable control signal 24 from control unit 60), moveable part 51 may contact stationary part 52B of valve 10 (e.g. stationary part 52A may comprise a valve seat, some other part of valve body 15 and/or the like). Accordingly, in such embodiments, moveable part 51 may move between its normally open/closed position (in contact with stationary part 52A) and its opposing closed/open position (in contact with stationary part 52B) as shown by double headed arrow 53 (FIG. 2). Contact of moveable part 51 with one or both of stationary parts 52A, 52B may cause mechanical vibration within body 15 of electrically-actuated valve 10.

Valve-diagnostic device 100 may be used to measure or determine a number of properties of electrically-actuated valve 10. Without limitation, these properties include:
- characteristics of control signal 24 (e.g. timing characteristics associated with when and/or how long a control signal 24 is active);
- characteristics of the movement of movable part 51 (e.g. timing characteristics associated with when moveable part 51 opens and/or how long moveable part 51 remains open to allow fluid flow through valve 10 and/or when movable part 51 closes and/or how long moveable part 51 remains closed to prevent fluid flow through valve 10);
- the length of delay between control signal 24 becoming active and movable part 51 opening (in the case of a normally closed valve) or closing (in the case of a normally opened valve);
- the length of delay between the control signal 24 becoming inactive and movable part 51 closing (in the case of a normally closed valve) or opening (in the case of a normally opened valve);
- the period between successive activations of control signal 24;
- the duty cycle of control signal 24 (e.g. the percentage of time that control signal 24 is active) and/or the duty cycle of valve 10 (e.g. the percentage of time that movable part 51 is open);

electrical and/or magnetic characteristics of a coil in actuator mechanism 50 in response to control signal 24; and the length of time movable part 51 takes to go from a start of its movement (i.e. start moving from its open or closed position) to settling at the end of its movement (i.e. to settle at its closed or open position).

As shown in FIGS. 1 and 2, valve-diagnostic device 100 comprises mechanical sensor 110. Mechanical sensor 110 measures one or more physical phenomena associated with the movement of a moveable part 51 (e.g. a plunger) of electrically-actuated valve 10 and generates a corresponding mechanical sensor signal 232 associated with such measurement. Mechanical sensor signal 232 is provided to data analyzer 250. Movement detected by mechanical sensor 110 may include, for example, linear movement, rotational movement, and/or vibrational movement. For example, when movable part 51 (e.g. a plunger) contacts one or both of stationary parts 52A, 52B as movable part 51 opens or closes, vibrations from this contact may propagate through body 15 of valve 10 and may be detected by mechanical sensor 110. In some embodiments, mechanical sensor 110 may be brought into mechanical (physical) contact with valve body 15 (possibly via intervening components such as body 102) to effect this measurement. Some mechanical sensors (such as accelerometers and the like) are directionally sensitive. In some embodiments, mechanical sensor 110 may be mounted on body 102 or otherwise oriented to detect movement along longitudinal axis 150 defined by valve-diagnostic device 100 (see FIGS. 1 and 9).

Mechanical sensor 110 may comprise, for example, a MEMS accelerometer, a piezoelectric accelerometer, a piezoelectric pressure sensor, a capacitive, electret, piezoelectric, magnetic, MEMS or other microphone, or a combination of these. Valve-diagnostic device 100 and/or data analyzer 250 may comprise suitable signal conditioning circuitry (not shown) which may process the output of mechanical sensor 110 to generate mechanical sensor signal 232 and/or may further process mechanical sensor signal 232. Such signal conditioning circuitry may comprise noise-reducing low-pass and/or high-pass filters, to reduce noise measured by mechanical sensor 110. Such signal conditioning circuitry may also comprise other components, such as amplifiers, buffers, analog to digital converters, analog and/or digital filters, digital processor(s), digital signal processor(s), field-programmable gate array(s) and the like known to those skilled in the art of using electrical signal output from sensors.

Mechanical sensor signal 232 output from mechanical sensor 110 may be used (e.g. by data analyzer 250 and/or by a human operator) to analyze and/or diagnose operational characteristics associated with the movement of moveable part 51 and the corresponding operational characteristics of valve 10. For example, if mechanical sensor signal 232 is not representative of vibrational movement associated with moveable part 51 opening and closing against stationary parts 52A, 52B, then this may be an indication that moveable part 51 is blocked or stuck and is not fully opening or closing.

As shown in FIG. 1, mechanical sensor 110 may be housed on a distal end 102B of body 102. Distal end 102B may be relatively far (when compared to proximal end 102A of body 102) from electrically-actuated valve 10 during operation of valve 10. In some embodiments, housing mechanical sensor 110 at distal end 102B may increase the signal-to-noise ratio for mechanical sensor 110, as compared to housing mechanical sensor 110 at proximal end 102A of body 102. The housing of mechanical sensor 110 at distal end 102B of body 102 is not necessary.

Referring to FIGS. 1 and 2, valve-diagnostic device 100 comprises at least one electrical sensor 120. Electrical sensor 120 measures one or more electrical (or electromagnetic) phenomena associated with the operation of electrically-actuated valve 10 and generates a corresponding electrical sensor signal 234 associated with such measurement. Electrical sensor signal 234 is provided to data analyzer 250. Electrical sensor 120 may detect, for example, electrical characteristics (e.g. current and/or voltage) associated with control signal 24, electrical characteristics (e.g. electric field) associated with actuator mechanism 50 or some other aspect of valve 10, electromagnetic characteristics (e.g. magnetic field) associated with actuator mechanism 50 (e.g. in the coil of actuator mechanism 50) or some other aspect of valve 10, or a combination of these.

Electrical sensor 120 may comprise, for example, a magnetometer (such as a Hall Effect sensor), an inductive coil, an antenna, a capacitive pickup, or a combination of these. In some embodiments, electrical sensor 120 may comprise a capacitive pickup plate which, in use, is brought into proximity of the wire carrying control signal 24 to form a capacitive coupling with the control signal wire. That is, electrical sensor 120 and the control wire associated with control signal 24 may each form one plate of a capacitor, such that control signal 24 causes a corresponding signal to be produced on the capacitive pickup plate of electrical sensor 120 due to the voltage generating the control signal 24. In some embodiments, electrical sensor 120 may additionally or alternatively comprise an inductive sensor which may comprise an inductor (not shown) which is sensitive to the changes in the magnetic field associated with electrical driving signals and power supply of actuator mechanism 50 (e.g. in the coil of actuator mechanism 50) when actuator mechanism 50 is electrically driven to cause force 23 to act on movable part 51. Valve-diagnostic device 100 and/or data analyzer 250 may comprise suitable signal conditioning circuitry (not shown) which may process the output of electrical sensor 120 to generate electrical sensor signal 234 and/or may further process electrical sensor signal 234. Such signal conditioning circuitry may comprise amplifiers, buffers, analog to digital converters, analog and/or digital filters, digital processor(s), digital signal processor(s), field-programmable gate array(s) and the like known to those skilled in the art of using electrical signal output from sensors.

Because electrical sensor 120 is sensitive to electromagnetic phenomena (rather than physical motion of electrically-actuated valve 10), body 102 does not necessarily need to be in physical contact with electrically-actuated valve 10 when electrical sensor 120 is being used. For example, where electrical sensor 120 comprises a capacitive pickup sensitive to a voltage which in turn generates a control signal 24 (as described above), the capacitive pickup may be sensitive to control signal 24 when the capacitive pickup is located close to, but not touching the control signal wire. As another example, where electrical sensor 120 comprises an inductive sensor sensitive to the current and/or magnetic field of electrical drive signals in actuator mechanism 50, the inductive sensor may be sensitive to such drive signals when the inductive sensor is located close to but not touching the drive circuit in actuator mechanism 50. Placing electrical sensor 120 as close as possible to electrically-actuated valve 10 may permit electrical sensor 120 to generate stronger electrical sensor signal 234 because the strength of electric and magnetic fields decrease with the distance from the source of the field (e.g. control wire 24 or actuator mechanism 50). Thus, placing electrical sensor 120 relatively close to electrically-actuated valve 10 (e.g. to the control wire carrying control signal 24 and/or to the drive circuit of actuator mechanism 50) may allow electrical sensor 120 to detect relatively weak electric or magnetic fields.

FIG. 1 shows electrical sensor 120 housed at proximal end 102A of body 102. Proximal end 102A may be relatively close to electrically-actuated valve 10. Housing electrical sensor 120 on proximal end 102A may allow electrical sensor 120 to detect electromagnetic phenomena associated with electrically-actuated valve 10 in locations where such phenomena are relatively strong.

Electrical sensor signal 234, output from electrical sensor 120, may be used (e.g. by data analyzer 250 and/or by a human operator) to analyze and/or diagnose operational characteristics associated with control signal 24 and/or actuator mechanism 50 and the corresponding operational characteristics of valve 10. For example, if no signal is detected from actuator mechanism 50, this may be an indication that there is a connection failure within electrically-actuated valve 10, such that control signal 24 is not reaching or otherwise causing a drive signal to be present in actuator mechanism 50. This may cause movable part 51 (e.g. a plunger) of electrically-actuated valve 10 to remain constantly closed, such that no fluid flow is allowed through electrically-actuated valve 10, or constantly open, such that no fluid restriction is effected by valve 10. As another example, if no control signal 24 is detected, this may indicate a problem with the control wire or with control unit 60.

Mechanical sensor 110 and electrical sensor 120 (and their corresponding mechanical and electrical output signals 232, 234) may be used together (e.g. by data analyzer 250 and/or by a human operator) to determine a condition of electrically-actuated valve 10. Using mechanical sensor 110 and electrical sensor 120 (and their respective output signals 232, 234) together may reveal information about electrically-actuated valve 10 that would not otherwise be obtained if mechanical sensor 110 or electrical sensor 120 were used alone.

Figure 3:
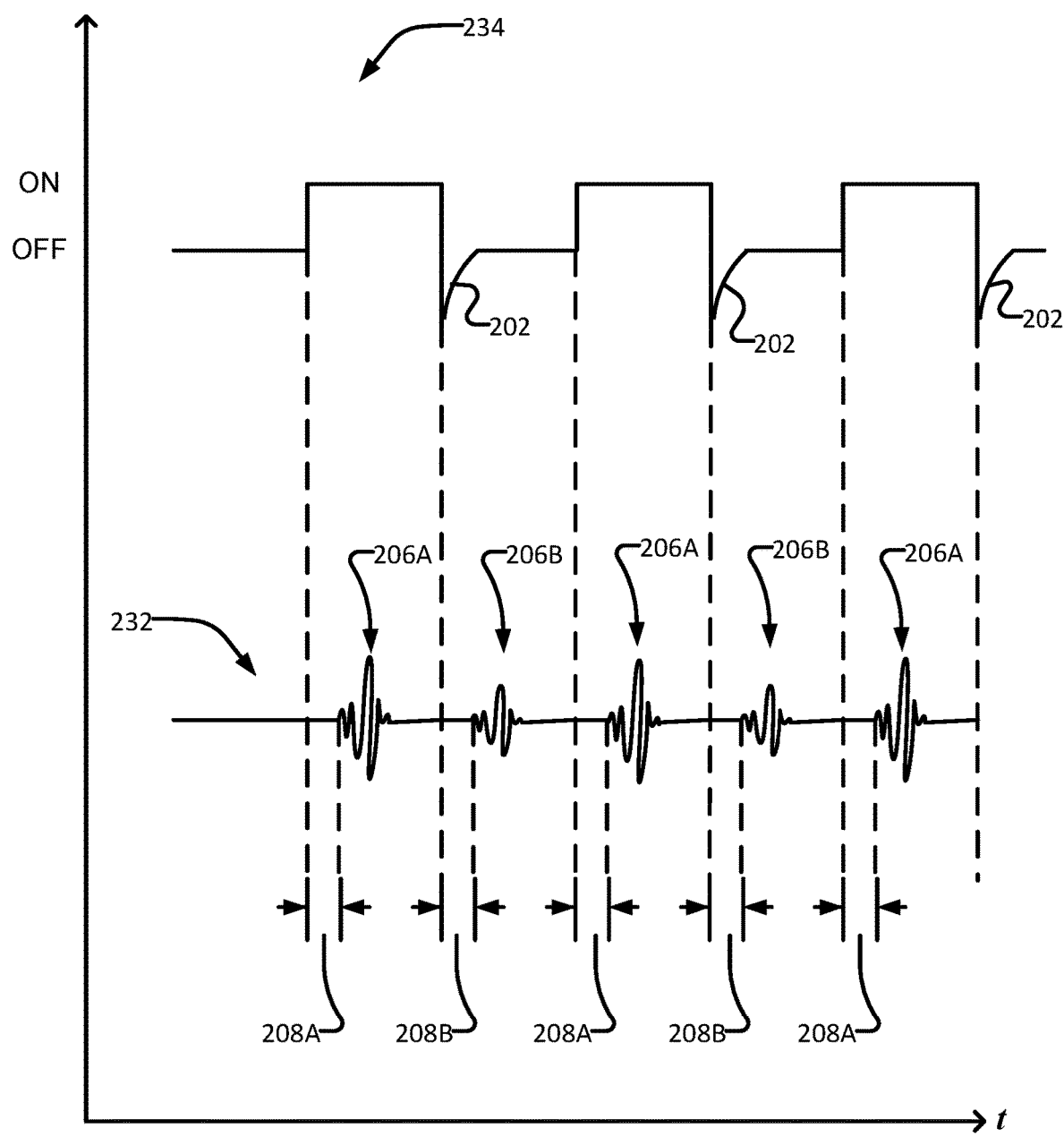
FIG. 3 is a graphical representation of an example mechanical sensor signal which may be output by a mechanical sensor of the FIG. 1 valve-diagnostic device in response to measuring contact between a movable part and stationary parts of an electrically-actuated valve and an example electrical sensor signal which may be output by an electrical sensor of the FIG. 1 valve-diagnostic device in response to measuring a control signal provided to the electrically-actuated valve according to a particular example embodiment.

FIG. 3 is a graphical representation of an example mechanical sensor signal 232 which may be output by a mechanical sensor 110 of the FIG. 1 valve-diagnostic device 100 in response to measuring contact between a movable part 51 and stationary parts 52A, 52B of an electrically-actuated valve 10 and an example electrical sensor signal 234 which may be output by an electrical sensor 120 of the FIG. 1 valve-diagnostic device 100 in response to measuring a control signal 24 provided to the electrically-actuated valve 100 according to a particular example embodiment. In the illustrated example of FIG. 3, electrical sensor 120 is sensitive to control signal 24 (e.g. a capacitive pickup of the type described above). If valve 10 is operating properly, control signal 24 is provided to actuator mechanism 50 and creates a corresponding drive signal in actuator mechanism 50 which in turn drives actuator mechanism 50 and causes force 23 to be applied to moveable part 51 to move moveable part between stationary parts 52A, 52B to open and close valve 10. The duty cycle of control signal 24 may determine the amount of time that valve 10 is open (or closed). The electrical sensor signal 234 shown in FIG. 3 is representative of the type of signal which may be output by electrical sensor 120 in response to such a control signal 24.

The example electrical sensor signal 234 shown in FIG. 3 switches between an OFF level (e.g. where no control signal 24 is present in the control wire) and an ON level (e.g. where control signal 24 is being conducted through the control wire). As seen in FIG. 3, electrical sensor signal 234 may exhibit "spikes" or transients 202 (as shown on the falling edges of electrical sensor signal 234). Transients 202 may correspond to the inductive "kick" of a solenoid coil in actuator mechanism 50 (e.g. a rapid and intense voltage transient caused by current continuing to flow through the coil of actuator mechanism 50 with no place to sink). Embodiments of the invention may comprise detecting small or missing transients, which may be indicative of a problem in the coil control circuitry (e.g. transistor breakdown, short circuits and/or the like). In some embodiments, the coil in actuator mechanism 50 is energized when the voltage of control signal is pulled to ground. In such embodiments, electrical sensor signal 234 will correspond to the ON configuration at the low voltage level and to the OFF configuration at the high voltage level, and the inductive kick will comprise a rapid increase in voltage on the rising edge of electrical sensor signal 234. In practice, the amplitude and/or duration of transients 202 may be different than what is shown in FIG. 3, where transients 202 have been shown for illustrative purposes.

As discussed above, mechanical sensor 110 is sensitive to physical movement associated with electrically-actuated valve 10. For example, mechanical sensor 110 may comprise an accelerometer or a microphone pickup which is sensitive to movement of movable part 51 (e.g. a plunger or other type of movable valve member) as movable part 51 is actuated by actuator mechanism 50 to move between moveable parts 52A, 52B to open and close valve 10. In some embodiments, such as the illustrated embodiment shown in FIG. 3 for example, moveable part 51 contacts each of stationary parts 52A, 52B as movable part 51 moves therebetween and causes corresponding vibration. In the illustrated example of FIG. 3, mechanical sensor 110 is sensitive to this vibration and generates mechanical sensor signal 232 in response to this vibration.

In the FIG. 3 example, it can be seen that mechanical sensor signal 232 exhibits oscillations 206A, 206B (collectively oscillations 206) which may correspond to contact between moveable part 51 and stationary parts 52A, 52B. Mechanical sensor signal 232 may be referred to as contact signal 232 for this reason. In the illustrated example of FIG. 3, the oscillations 206A exhibited by mechanical sensor signal 232 when control signal 24 is at its ON level are relatively small compared to the oscillations 206B exhibited by mechanical sensor signal 232 when control signal 24 is at its OFF level. Valve 10 is biased toward its normal configuration (e.g. normally closed), typically by a spring or other bias mechanism. The difference in the size of oscillations 206A, 206B may be because when movable part 51 moves against this bias mechanism (in response to control signal 24 being ON), the force generated on movable part 51 (and with which moveable part contacts a corresponding stationary part 52A) is relatively large to overcome the bias mechanism, whereas when movable part 51 returns to its normal (e.g. normally closed) position (in response to control signal 24 being OFF), the contact of movable part 51 with the other stationary part 52B may be dampened by the fluid in the valve bore. In other valves, the size of oscillations 206 may be about the same (in a normally functioning valve) or the size of oscillations 206A (associated with control signal 24 being ON) may be larger than the size of oscillations 206B (associated with control signal 24 being OFF).

The FIG. 3 plot of mechanical sensor signal 232 exhibits time delays 208A between the rising edges of electrical sensor signal 234 and the detected vibrations 206A in mechanical sensor signal 232 and time delays 208B between the falling edges of electrical sensor signal 234 and the detected vibrations 206B in mechanical sensor signal 232. These time delays 208A, 208B (collectively, delays 208) may reflect the lag between the time that control signal 24 switches between its ON and OFF state and the time that it takes for actuator mechanism 50 to apply force 23 to moveable part 51 and to thereby cause moveable part 51 to switch between contact with one of stationary parts 52 to contact with the opposing one of stationary parts 52. In some instances, rising edge time delays 208A, where moveable part 51 is moving against the bias mechanism of valve 10, may be greater (on average) than falling edge time delays 208B. In some instances, the opposite may be true. Time delays 208 may be on the order of milliseconds. In FIG. 3, time delays 208 have been exaggerated for illustrative purposes, and in practice may be smaller relative to the switching times of electrical sensor signal 234 (and control signal 24).

To effectively measure time delays 208, mechanical sensor signal 232 and electrical sensor signal 234 are obtained simultaneously (or at least over the same switching periods of control signal 24) by simultaneously measuring mechanical phenomena associated with valve 10 (e.g. movement of moveable part 51) and measuring electrical phenomena associated with valve 10 (e.g. control signal 24 in the case of the FIG. 3 example). Valve-diagnostic device 100 permits such simultaneous measurement by housing both electrical sensor 120 (which detects control signal 24 and generates electrical sensor signal 234) and mechanical sensor 110 (which detects movement of movable part 51 and generates mechanical sensor signal 232) on body 102.

Time delays 208 may be indicative of a condition of electrically-actuated valve 10. That is, valve 10 may have a threshold rising edge and falling edge time delays $T_{ON}$, $T_{OFF}$, which correspond to whether electrically-actuated valve 10 (and, in particular actuator mechanism 50 and/or moveable part 51) is functioning properly. If time delays 208A are less than the rising edge threshold $T_{ON}$ and time delays 208B are less than the falling edge threshold $T_{OFF}$, then actuator mechanism 50 and movable part 51 of valve 10 may be considered to be a "healthy" or "pass" state. If either of time delays 208A, 208B are longer than their corresponding thresholds $T_{ON}$, $T_{OFF}$, then actuator mechanism 50 or movable part 51 of valve 10 may be considered to be in a "fail" state. Thresholds $T_{ON}$, $T_{OFF}$ may be, for example, 0.1 milliseconds, 0.5 milliseconds, 1 millisecond, 5 milliseconds, 10 milliseconds, or longer. Thresholds $T_{ON}$, $T_{OFF}$ may vary for individual valves 10, or for different types of valves 10 and may be user-configurable for this purpose.

In some embodiments, the comparison of time delays 208 to thresholds $T_{ON}$, $T_{OFF}$ may be used to perform preventative maintenance on electrically-actuated valve 10. That is, if time delays 208 are less than, but close to, their corresponding thresholds $T_{ON}$, $T_{OFF}$ (for example, if threshold time delay $T_{ON}$ is 10 milliseconds and time delay 208A is 8 milliseconds), this may indicate that valve 10 is close to failing. Valve 10 may then be repaired or replaced before ever reaching the fail state where time delay 208A is greater than threshold time delay $T_{ON}$.

Where threshold time delay $T_{ON}$, $T_{OFF}$ is unknown for a particular type of electrically-actuated valve 10 or in some instances even where threshold time delays $T_{ON}$, $T_{OFF}$ are known, valve-diagnostic device 100 may be used to measure time delays 208A, 208B for valve 10 and/or for each of a plurality of electrically-actuated valves 10 of that particular type and statistical analysis may be performed to assess whether valve 10 should be replaced. For example, in some embodiments, time delays 208 may be measured for a plurality of different valves of the same type and the averages or means of these time delays 208 may serve as proxies for the unknown threshold time delays $T_{ON}$, $T_{OFF}$, against which an individual electrically-actuated valve 10 may be tested to determine if it is in (or close to) the fail state. Statistical analysis may also be performed to assess the condition of a particular valve 10 (whether or not the threshold time delays $T_{ON}$, $T_{OFF}$ are known). For example, time delays 208 may be measured for a valve 10 under consideration and the mean and standard deviation (σ) of the measured time delays 208 may be determined over a number of switching cycles. The valve 10 under consideration may "fail", for example, if any of its measured time delays 208 are greater than a deviation threshold $T_{DEV}$. This deviation threshold $T_{DEV}$ may be based on the standard deviation σ. For example, in some embodiments, $T_{DEV}=2σ$; in some embodiments $T_{DEV}=3σ$. In some embodiments, the valve 10 may additionally or alternatively fail if the standard deviation σ of its response times is greater than a suitable threshold $σ_{MAX}$. For example, the valve 10 under consideration may fail if the standard deviation σ determined over a number of valve cycles is greater than some percentage of the mean time delay 208 of the number of valve cycles (e.g. $σ>σ_{MAX}=20\%$ of the mean; $σ>σ_{MAX}=10\%$ of the mean; $σ>σ_{MAX}=30\%$ of the mean).

Figure 4:
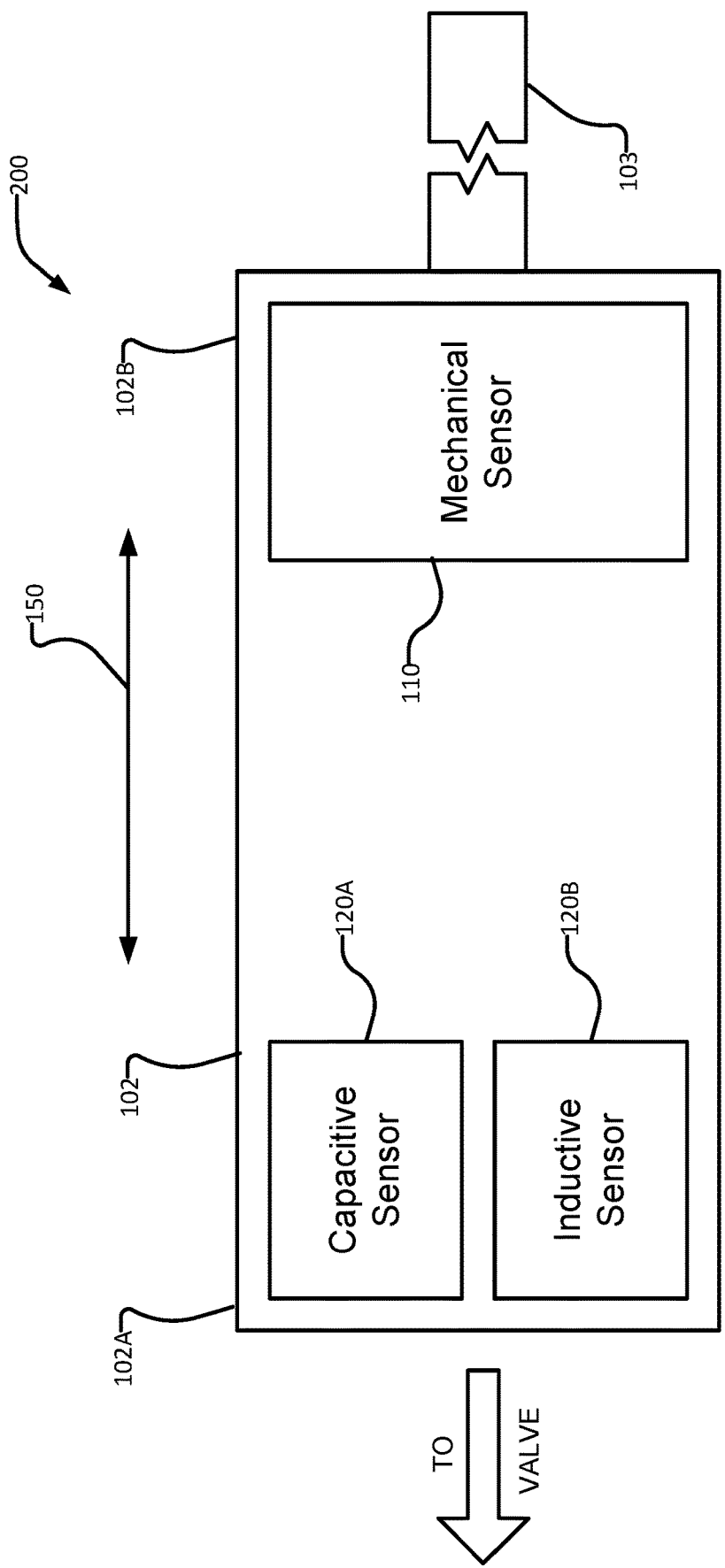
FIG. 4 is a schematic diagram of a valve-diagnostic device comprising a mechanical sensor, an electric field sensitive (e.g. capacitive) sensor, and a magnetic field sensitive (e.g. inductive) sensor, according to another embodiment of the invention.

FIG. 4 is a schematic view of valve-diagnostic device 200, according to another embodiment of the invention. Valve-diagnostic device 200 is substantially similar to valve-diagnostic device 100 described herein except that valve-diagnostic device 200 expressly comprises two electrical sensors 120: capacitive sensor 120A (and/or some additional or alternative sensor(s) that is/are sensitive to electrical fields) and inductive sensor 120B (and/or some additional or alternative sensor(s) that is/are sensitive to magnetic fields) which may generate a pair of electrical sensor signals 234A, 234B (see FIG. 2). For the purposes of this and similar embodiments, references herein to capacitive sensor 120A may comprise any of a number of electrical sensors sensitive to electrical phenomena and references herein to inductive sensor 120B may comprise any of a number of electrical sensors sensitive to magnetic phenomena. In other respects, valve-diagnostic device 20 may be similar to (and have similar features to) valve-diagnostic device 100 described elsewhere herein. As described above, capacitive sensor 120A may comprise a plate (referred to as a capacitive pickup) which may be capacitively coupled to the wire carrying control signal 24 to measure electrical characteristics of control signal 24. Inductive sensor 120B may comprise an inductor (not shown) which is sensitive to the current (and/or corresponding magnetic field) associated with electrical driving signals in actuator mechanism 50 (e.g. in the coil of actuator mechanism 50) when actuator mechanism 50 is electrically driven to cause force 23 to act on movable part 51.

Figure 5:
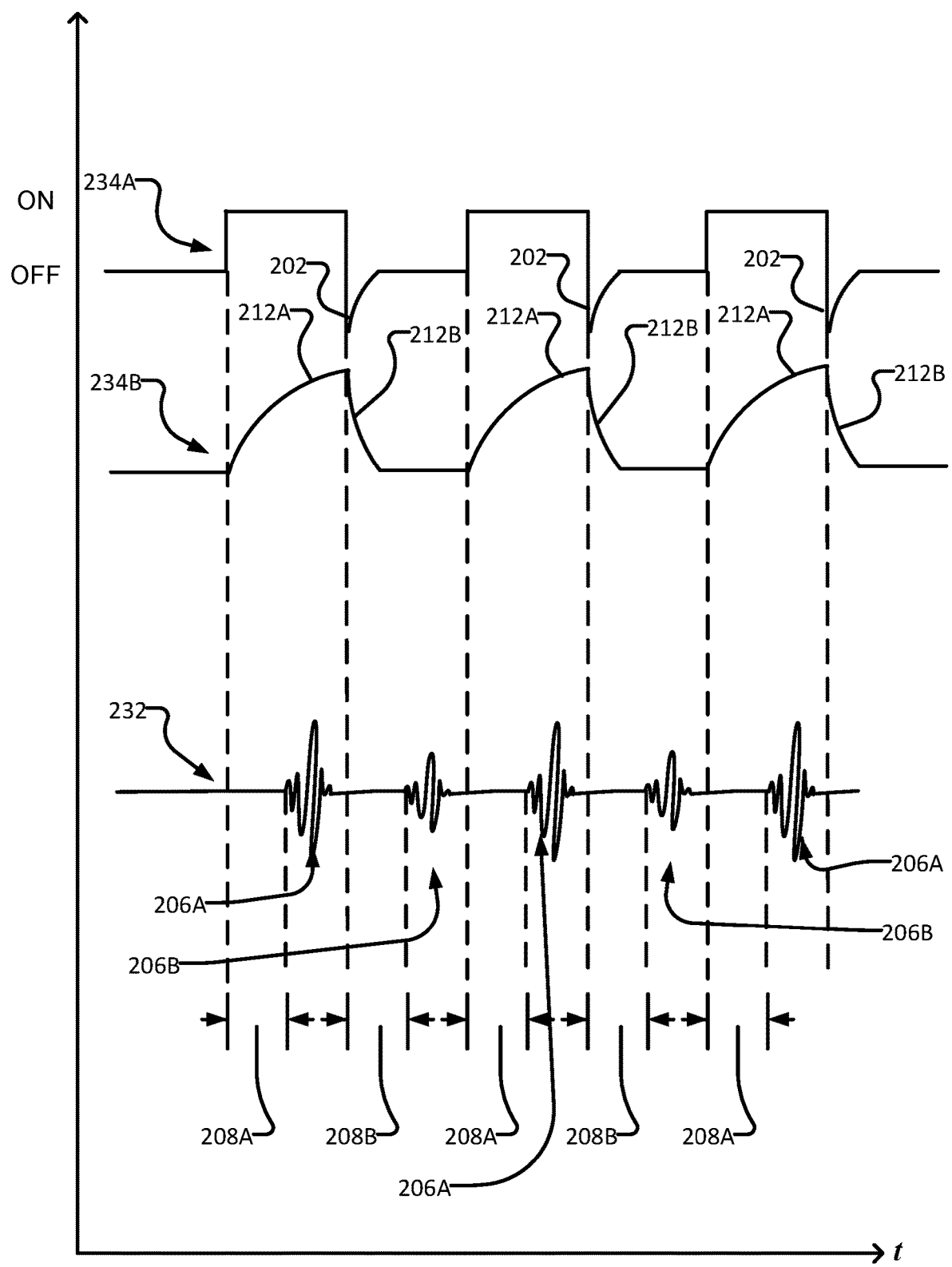
FIG. 5 is a graphical representation of an example mechanical sensor signal which may be output by a mechanical sensor of the FIG. 4 valve-diagnostic device in response to measuring contact between a movable part and stationary parts of an electrically-actuated valve and example electrical sensor signals which may be output by the electrical sensors (e.g. the capacitive sensor and the inductive sensor) of the FIG. 4 valve-diagnostic device in response to measuring a control signal provided to the electrically-actuated valve and in response to measuring the voltage or current (and/or corresponding magnetic field) associated with electrical driving signals in the actuator mechanism of the electrically-actuated valve according to a particular example embodiment.

Using both capacitive sensor 120A and inductive sensor 120B and their corresponding electrical sensor signals 234A, 234B may provide additional diagnostic information about electrically-actuated valve 10, compared to the information available when using only one electrical sensor 120. FIG. 5 is a graphical representation of an example of sensor signals 232, 234A, 234B of the FIG. 4 valve-diagnostic device 200 according to a particular example embodiment. Mechanical sensor signal 232 shown in FIG. 5 may be output by mechanical sensor 110 of valve-diagnostic device 200 in response to measuring movement of movable part 51 (e.g. contact between movable part 51 and stationary parts 52A, 52B of an electrically-actuated valve 10). Electrical sensor signal 234A shown in FIG. 5 may be output by capacitive sensor 120A of valve-diagnostic device 200 in response to measuring a control signal 24 provided to the electrically-actuated valve 10 and electrical sensor signal 234B shown in FIG. 5 may be output by inductive sensor 120B of valve-diagnostic device 200 in response to measuring the current (and/or corresponding magnetic field) associated with electrical driving signals in actuator mechanism 50 of electrically-actuated valve 10. Mechanical sensor signal 232 and electrical (capacitive) sensor signal 234A shown in FIG. 5 may be substantially similar to mechanical sensor signal 232 and electrical sensor 234 shown in FIG. 3 and may exhibit similar properties. The profile of electrical sensor signal 234B shown in the FIG. 5 example corresponds to the inductive properties of actuator mechanism 50 (e.g. a solenoid in actuator mechanism 50). More specifically, electrical sensor signal 234B shown in FIG. 5 is representative of the current in the solenoid of actuator mechanism 50. Such an electrical sensor signal 234B could be obtained by a second electrical sensor 120B which may comprise, for example, a suitably positioned Hall effect sensor or other type of magnetometer. In some embodiments, this second electrical sensor 120B may be referred to as a magnetic sensor, since it is sensitive to the magnetic field in the solenoid of actuator mechanism 50. In some embodiments, the second electrical sensor 120B comprises an inductive sensor 120B, such as an air-core inductor or a ferromagnetic-core inductor, and the output of such a sensor 120B may be the derivative of the signal 234B shown in FIG. 5. The output of such an inductive sensor 120B may be integrated (in the analog or digital domain) to obtain an electrical sensor signal 234B of the type shown in FIG. 5. For the purposes of this and similar embodiments electrical sensor signals 234A and 234B may be referred to as electrical (capacitive) sensor signal and electrical (inductive) sensor signal respectively, but it is understood that these signals may be alternatively produced by other types of sensors, as discussed herein.

The FIG. 5 plot of electrical (inductive) sensor signal 234B exhibits an asymptotic exponential rise or approach 212A to a steady state reflective of the time that it takes for the corresponding circuit (not shown) to energize the magnetic field of the solenoid in actuator mechanism 50 and exponential decay 212B reflective of the time that it takes the corresponding circuit (not shown) to discharge the magnetic field of the solenoid in actuator mechanism 50. Time constants can be measured in association with the asymptotic exponential rises 212A and exponential decays 212B of electrical sensor signal 234B. These measured time constants of asymptotic rises 212A and decays 212B of electrical sensor signal 234B are associated with the time constants of the energizing and discharging of the solenoid in actuator mechanism 50 and are reflective of the health of the circuits. Rise times and/or decay times may also be measured. Such rise times or decay times may represent the times between 5% and 95% of the amplitude change (e.g. the total amplitude change in a waveform like that of signal 234B shown in FIG. 5) in some embodiments or between 10% and 90% of the amplitude change in some embodiments or between 20% and 80% of the amplitude change in some embodiments. A decay (discharge) time that is greater than a charging time may be indicative of a problem with valve 10, such as a bad ground or faulty connection. Embodiments of the invention may comprise comparing the rise time to the decay time (and/or the exponential time constant associated with asymptotic rise 212A to the exponential time constant associated with decay 212B) to ascertain problems with valve 10.

Providing sensors which produce mechanical sensor signal 232 associated with the movement of moveable part 51, electrical (capacitive) sensor signal 234A associated with control signal 24 and electrical (inductive) sensor signal 234B associated with the drive signals in actuator mechanism 50 enables the determination of additional information about electrically-actuated valve 10, compared to having only one electrical signal. For example, as discussed above, measured time delays 208A, 208B may be compared to corresponding threshold time values $T_{ON}$, $T_{OFF}$ and/or statistical analysis may be performed on these measured time delays 208a, 208B to determine whether electrically-actuated valve 10 is in a fail state. However, evaluation of these time delays 208A, 208B may not reveal precisely why valve 10 is in the fail state. For example, time delays 208A, 208B exceeding thresholds $T_{ON}$, $T_{OFF}$ may be caused by problems with actuator mechanism 50 and/or by problems with moveable part 51 itself. Using an inductive sensor 120B to generate electrical (inductive) sensor signal 234B may help to provide information which may be used to discern additional or alternative reasons for valve 10 and/or may provide information which may be used to discern the reason for failure of valve 10 with more precision. For example, if the asymptotic exponential rise regions 212A or exponential decay regions 212B have time constants that are outside of threshold ranges around expected time constant $T_{CON\_EXP}$, $T_{COFF\_EXP}$, this may indicate that there is a problem with actuator mechanism 50 or with the circuits associated with the charging and discharging of the coil of actuator mechanism 50. Like the above-discussed comparison of time constants 208 to time constants obtained from other valves of the same type, similar comparison of time constants of exponential regions 212A, 212B may be performed against valves of the same type (including, possibly, other valves that use similar circuits). Like the above-discussed statistical analysis of time constants 208 (e.g. threshold standard deviations, threshold deviations from the mean and/or the like), similar statistical analysis of time constants of exponential regions 212A, 212B may be performed. Additionally or alternatively, the time constant in rising asymptotic exponential region 212A may be compared to the time constant in falling exponential region 212B to determine a condition associated with a non-operational valve (e.g. if these time constants are too different from one another). In addition to or in the alternative to consideration of the time constants in exponential regions 212A, 212B, all of the same analysis may be done by comparing the rise and fall times of exponential regions 212A, 212B. Electrical (inductive) sensor signal 234B may also be used, in some embodiments, as a timing reference for synchronizing the other measured signals (e.g. mechanical signal 232 and/or electrical sensor signal 234A). In this regard, the magnetic field in the solenoid of actuator mechanism 50 may be more localized (e.g. concentrated in a vicinity of the solenoid) than the electrical field measured by electrical sensor 120A and/or the mechanical phenomena measured by mechanical sensor 110 and electrical (e.g. inductive/magnetic) sensor 120B may exhibit relatively low noise sensitivity. In this capacity, synchronization may involve measuring criteria, such as time delays 208 or the characteristics of inductive transients 202, relative to the edges (e.g. sharp (high) rates of change or discontinuities) present in electrical sensor signal 234B, although this is not necessary and such measurements may be made relative to the edges (e.g. sharp (high) rates of change or discontinuities) present in electrical sensor signal 234A.

In some embodiments, valve-diagnostic device 200 may be provided without capacitive sensor 120A and may not have access to corresponding electrical (capacitive) sensor signal 234A. In such embodiments, valve-diagnostic device 100 may measure time delays 208 between the activation/de-activation of actuator mechanism 50 (e.g. the sharp (high) rates of change or discontinuities of electrical signal sensor 234B) and the corresponding vibrations 206A, 206B associated with the contact of movable part 51 with stationary parts 52A, 52B, and compare these time delays 208 to threshold time delay $T_{ON}$, $T_{OFF}$ and/or conduct statistical analysis on these time delays 208 to determine if electrically-actuated valve 10 is in a pass state or fail state.

Referring again to FIG. 2, valve-diagnostic device 100, 200 may be connected to provide sensor signals (e.g. mechanical sensor signal 232 and/or electrical sensor signals 234A, 234B) to a data analyzer 250. Data analyzer 250 (which may comprise one or more suitable configurable processors 254 (discussed further below) or which may be connectable to one or more suitable external processors) may analyze or display the data received from valve-diagnostic device 100, 200. Sensor signals 232, 234A, 234B may be provided to data analyzer 250 via a wired or wireless (e.g. Bluetooth™) connection. Such a connection may be one-way, such that data analyzer 250 only receives data from valve-diagnostic device 100, 200 or two-way, such that data analyzer 250 may also transmit information (such as calibration information, sensitivity settings for the sensors, or software updates) to valve-diagnostic device 100, 200. Data analyzer 250 may, in some embodiments, provide power to valve-diagnostic device 100 through this connection.

Figure 6:
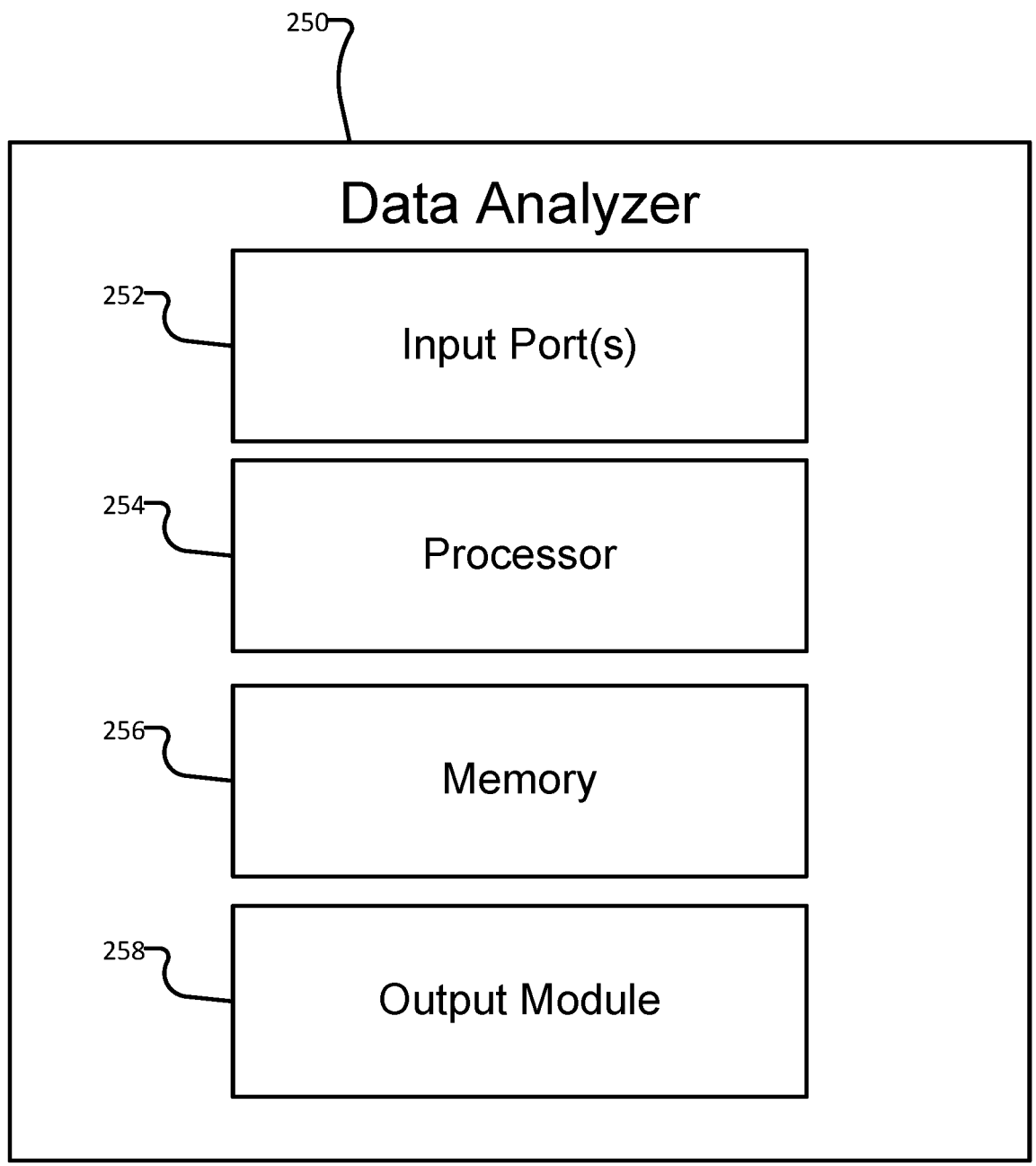
FIG. 6 is a schematic diagram of a data analyzer suitable for use with the FIG. 1 and FIG. 4 valve-diagnostic devices according to a particular embodiment.

FIG. 6 is a schematic block diagram of a data analyzer 250 suitable for use with the FIG. 1 and FIG. 4 valve-diagnostic devices 100, 200 according to a particular example embodiment. Data analyzer 250 may comprise, for example, a microcontroller, a personal computer, a laptop computer, an oscilloscope, a customized computer, a smartphone, a tablet computer, an interface board connected to a computer, or the like. Data analyzer 250 of the FIG. 6 illustrated embodiment comprises one or more input ports 252 for receiving signals (e.g. mechanical and/or electrical sensor signals 232, 234A, 234B) from valve-diagnostic device 100, 200, processor 254, memory 256, and output module 258.

Processor 254 may comprise, for example, a central processing unit of a general purpose computer, an embedded microprocessor, programmable logic circuitry, an electronic circuit that manipulates data, a module capable of performing arithmetic operations, combinations of these and/or the like. Processor 254 may be configured to perform particular functionalities using suitable software. Signals (e.g. mechanical and/or electrical sensor signals 232, 234A, 234B) received at input port(s) 252 may be processed by processor 254 and stored in memory 256. Signals (e.g. mechanical and/or electrical sensor signals 232, 234A, 234B) received from valve-diagnostic device 100, 200 may be in analog form when they reach input port(s) 252. Processor 254 may then perform analog-to-digital conversion on signals 25 before storing them in memory 256. In other embodiments, these signals (e.g. mechanical and/or electrical sensor signals 232, 234A, 234B) may be digitized in valve-diagnostic device 100, 200 prior to being transmitted to input port(s) 252 of data analyzer 250.

Output module 258 may provide raw or processed data to a user of data analyzer 250. Output module 258 may comprise, for example, a display housed on data analyzer 250, a speaker, a data port connectable to other information systems, one or more visual indicators (e.g. LEDs or the like) and/or the like.

In some embodiments, data analyzer 250 emits signals 260 which may interact with electrically-actuated valve 10, as shown in FIG. 2. Signals 260 may comprise, for example, signals which may be used by suitable output devices (not shown) to generate corresponding electric and/or magnetic fields which interact with valve 10. Valve-diagnostic device 100, 200 may then measure the response of valve 10 to the applied electric and/or magnetic field. For example, data analyzer 250 may use signal 260 to produce a magnetic field which may be used to test the continuity and functionality of the solenoid of actuator mechanism 50. As an additional or alternative example, signal 260 may be used to simulate the effect of control signal 24, and valve-diagnostic device 100, 200 may measure the response of actuator mechanism 50 (e.g. inductive sensor signal 234B) and movable part 51 (mechanical signal 232) to the simulated control signal. Signal 260 may additionally or alternatively be used to provide valve 10 with an independent source of power to facilitate testing of the power provided to valve 10. In some such embodiments where valve 10 is part of a fuel-injection or other active system, valve 10 can be tested while the surrounding engine (or other system) is off and does not generate control signal 24. Testing electrically-actuated valve 10 while the engine (or other system) is off may reduce the noise picked up by mechanical sensor 110 or electrical sensor(s) 120, thereby increasing the signal-to-noise ratio for these sensors.

Referring again to FIG. 2, sensor signals 232, 234A, 234B which are measured by valve-diagnostic device 100, 200 and transmitted to data analyzer 250 may be analog voltages and currents correlated with electric fields, magnetic fields, and/or movement of electrically-actuated valve 10. In other embodiments, valve-diagnostic device 100, 200 comprises suitable ADCs and signal conditioning circuitry for converting the analog sensor signals into digital sensor signals and suitable digital transmission circuitry for transmitting the digital signals (for example, via 120, SPI, UART, or other protocols) to data analyzer 250.

In some embodiments, sensor signals 232, 234A, 234B which are measured by valve-diagnostic device 100, 200 may be modulated before being transmitted to data analyzer 250. This allows signals from multiple sensors to be sent over a single connection.

Figure 7:
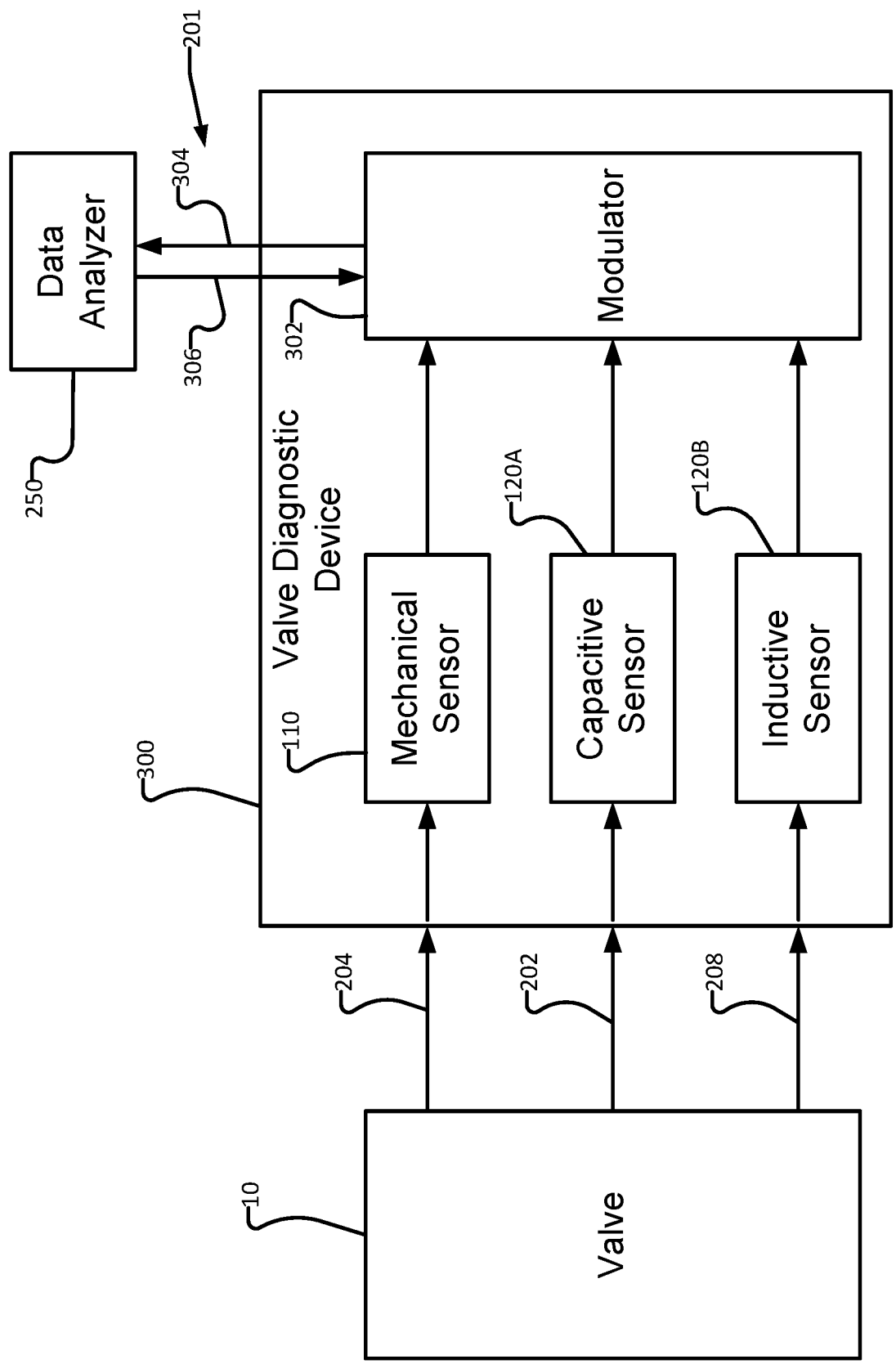
FIG. 7 is a schematic diagram of a valve-diagnostic device comprising a modulator, according to another embodiment of the invention.

FIG. 7 is a schematic diagram of a valve-diagnostic device 300 comprising a modulator 302, according to another embodiment of the invention. Valve-diagnostic device 300 is similar to valve-diagnostic device 200 described herein and comprises mechanical sensor 110 which generates corresponding mechanical sensor signal 232, electrical (capacitive) sensor 120A which generates corresponding electrical (capacitive) sensor signal 234A and electrical (inductive) sensor 120B which generates corresponding electrical (inductive) sensor signal 234B all of which may be substantially similar to (and comprise similar features to) sensors 110, 120A, 120B and sensor signals 232, 234A, 234B described herein.

Valve diagnostic device 300 differs from valve-diagnostic device 200 in that valve-diagnostic device 300 comprises a modulator 302. Modulator 302 modifies and/or combines sensor signals 232, 234A, 234B, and transmits a modulated signal 304 to data analyzer 250. For example, each sensor signal 232, 234A, 234B may be individually amplified, filtered, and modulated in frequency by modulator 302.

Sensor signals 232, 234A, 234B may then be mixed and transmitted to data analyzer 250 as modulated signal 304. Sending a single modulated signal 304 may reduce the number of lines needed to transmit data to data analyzer 250. This may reduce the bulkiness of connections between valve diagnostic device 300 and data analyzer 250, and may allow for the use of more durable, lower cost, and more convenient cables or connectors.

Modulator 302 may comprise one or more analog modulators, digital encoders, multiplexers, or the like. Combining sensor signals 232, 234A, 234B may include, for example, amplitude modulation, phase modulation, frequency modulation, time division multiplexing, and/or the like. In an example embodiment, modulated signal 304 comprises one unmodulated sensor signal, one sensor signal modulated with a centre frequency of 290 kHz, and one sensor signal modulated with a centre frequency of 410 kHz. In another example embodiment, modulated signal 304 comprises one unmodulated sensor signal, one sensor signal modulated with a centre frequency of 476 kHz, and one sensor signal modulated with a centre frequency of 952 kHz. In a further example embodiment, modulated signal 304 comprises one amplitude modulated sensor signal and two frequency modulated sensor signals.

As seen in FIG. 7, data analyzer 250 may transmit a control signal 306 to modulator 302. Control signal 306 may control the parameters of modulator 302, switch modulator 302 into different modes of operation, or the like. In other respects, valve-diagnostic device 300 is similar to valve-diagnostic device 200 described herein and may comprise any of the features of valve-diagnostic device 200 described herein.

Valve diagnostic device 100, 200 and/or data analyzer 250 may comprise hardware and/or software methods to reduce noise detected by mechanical sensor 110 or electrical sensor 120. For example, hardware may include, without limitation, high-pass analog filters to eliminate DC bias, followed by FM demodulation, then low-pass analog filters, and then anti-aliasing filters to eliminate frequencies above the Nyquist frequency of the analog-to-digital converter and/or the like. Digital techniques, which may be implemented by suitable digital signal processing software may include, for example, Fast Fourier Transform based noise cancellation, differentiation techniques (e.g. to locate rapid signal changes), average and root mean squared calculations (e.g. to find signal levels), crossing detections (e.g. crossings of the average and/or RMS levels to detect high or low levels), integration techniques to find duty cycle, and other temporal phenomena and/or the like.

Figure 8:
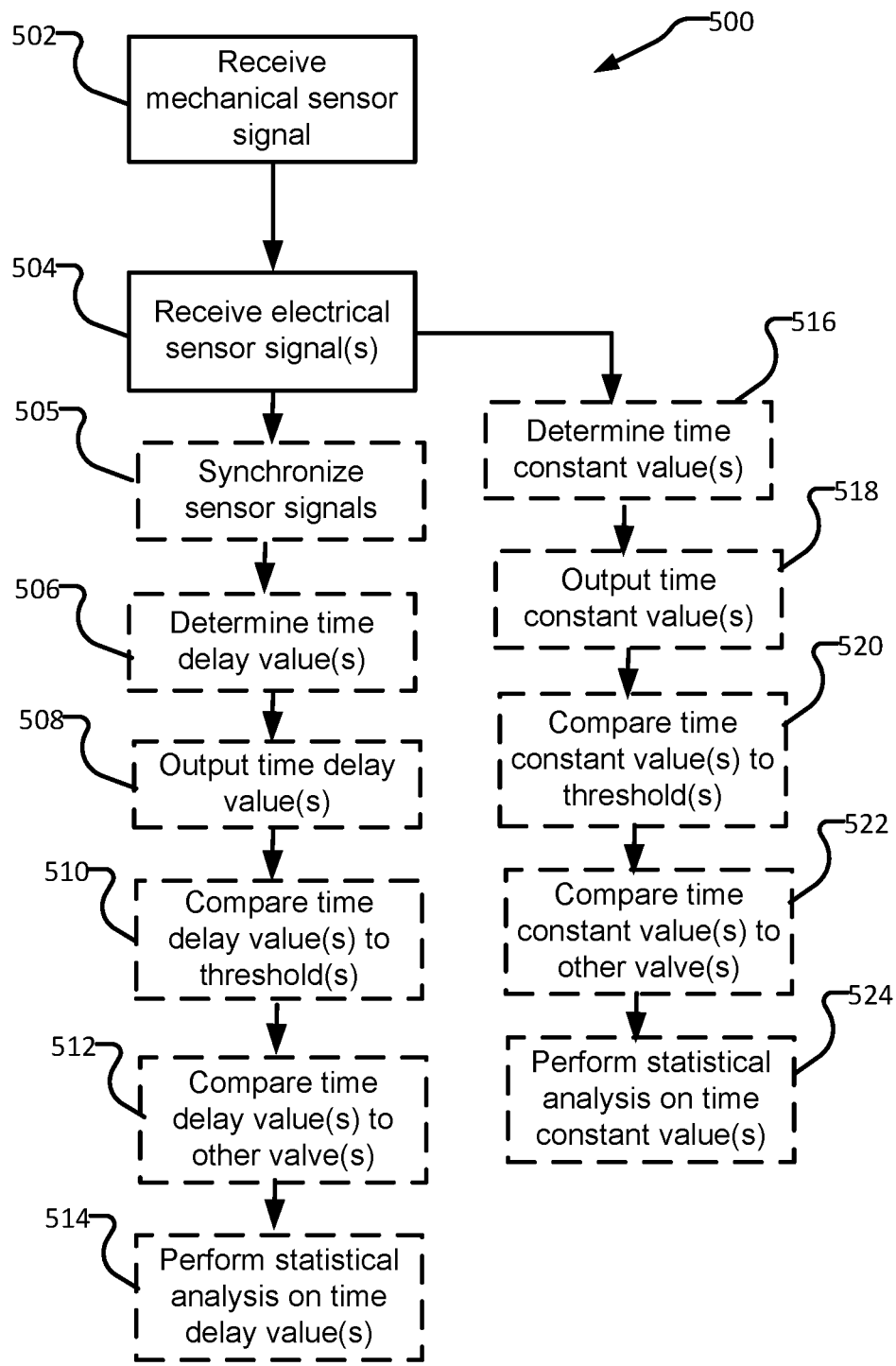
FIG. 8 is a block diagram of a method for using the valve-diagnostic device of FIG. 1 or FIG. 4 to determine the condition of an electrically-actuated valve according to a particular embodiment.

FIG. 8 is a block diagram showing a method 500 for using valve diagnostic device 100, 200 to determine the condition of electrically-actuated valve 10 according to a particular embodiment. Method 500 may be performed by processor 254 of data analyzer 250. For the purposes of explanation, method 500 is explained in relation to valve-diagnostic device 200, except where specifically noted. It will be understood that valve-diagnostic device 100 could be used to perform at least a portion of a similar method.

Method 500 begins at step 502, where a mechanical sensor signal 232 generated by mechanical sensor 110 of valve-diagnostic device 100 is received at data analyzer 250. Step 504 involves receiving, at data analyzer 250, one or more electrical sensor signals 234A, 234B generated by electrical sensors 120A, 120B of valve-diagnostic device 100. In some embodiments (e.g. where method 500 is performed using valve-diagnostic device 200 with a capacitive electrical sensor 120A and an inductive electrical sensor 120B), step 504 may involve receiving corresponding electrical sensor signals 234A, 234B from both electrical sensors 120A, 120B. Steps 502 and 504 may be performed simultaneously or in sequence. Alternatively, in some embodiments, where method 500 is performed using valve-diagnostic device 300, data analyzer 250 may receive a single modulated signal 304, which comprises the mechanical and electrical signals 232, 234A, 234B.

The remaining portions of method 500 are optional. Method 500 may involve any of these functional steps or none of these functional steps. In block 505, method 500 involves synchronizing the sensor signals 232, 234A, 234B measured from different sensors. This block 505 synchronization may involve synchronizing all of the available sensor signals to the edges or zero crossings of one sensor signal (typically one of electrical sensor signals 234A, 234B). Where electrical (inductive) sensor signal 234B is available, it may be used for such synchronization.

At step 506, time delays 208A, 208B are determined by data analyzer 250, based on mechanical sensor signal 232 and electrical signal 234A (or electrical signal 234B) received by data analyzer 250. At step 508, information representative of time delays 208 may be output, for example to a display on data analyzer 250. The block 508 output may be one or more representative numbers (e.g. an average value of time delays 208 in suitable time units (e.g. milliseconds)), or may be a graphical representation such as that shown in FIGS. 3 and 5.

Method 500 of the illustrated embodiment may then proceed to one or more of steps 510, 512, 514. At step 510, time delays 208A, 208B are compared to threshold time delays $T_{ON}$, $T_{OFF}$, to determine whether electrically-actuated valve 10 is in a fail state. At step 512, time delays 208A, 208B may be compared to time delays measured from one or more different electrically-actuated valves 10 of the same type as the valve 10 under consideration. Step 512 may be performed where threshold time delays $T_{ON}$, $T_{OFF}$ are unknown, although step 512 may be performed in addition to step 510 even where threshold time delays $T_{ON}$, $T_{OFF}$ are known. Step 514 involves performing statistical analysis on time delays 208A, 208B over a number of valve cycles. As discussed above, such statistical analysis may involve comparing deviations to threshold values (e.g. a deviation of a time delay 208 larger than 2 or 3 times the standard deviation for a data set of the same or similar valves may be considered to be a fail) or comparing the standard deviation to the mean (e.g. a standard deviation that is larger than some suitable percentage of the mean may be considered to be a fail).

Method 500 may additionally or alternatively proceed from block 504 to optional block 516 which may involve determining time constants in the exponential rise and exponential decay regions 512, 512B. At step 518, information representative of time constants 212A, 212B may be output, for example to a display on data analyzer 250. The block 518 output may be one or more representative numbers (e.g. an average value of time constants 212A, 212B in suitable time units (e.g. milliseconds)), or may be a graphical representation such as that shown in FIGS. 3 and 5.

Method 500 of the illustrated embodiment may then proceed to one or more of steps 520, 522, 524. At step 520, time constants in exponential regions 212A, 212B are compared to threshold time constants, to determine whether electrically-actuated valve 10 is in a fail state. In some embodiments, block 520 may involve comparing the time constant in exponentially rising region to the time constant in the exponential decaying region to determine a fail state (e.g. if the two time constants are too similar to one another). At step 512, time constants in exponential regions 212A, 212B may be compared to time constants measured from one or more different electrically-actuated valves 10 of the same type as the valve 10 under consideration. Step 522 may be performed where threshold time constants are unknown, although step 522 may be performed in addition to step 520 even where time constant thresholds are known. Step 524 involves performing statistical analysis on time constants in exponential regions 212A, 212B over a number of valve cycles. As discussed above, such statistical analysis may involve comparing deviations to threshold deviations (e.g. a deviation of a time constant larger than 2 or 3 times the standard deviation may be considered to be a fail) or comparing the standard deviation to the mean (e.g. a standard deviation that is larger than some suitable percentage of the mean may be considered to be a fail). In addition to analyzing time constants in exponential regions 212A, 212B, any of the functionalities of any of blocks 516, 518, 520, 522 and/or 524 may be additionally or alternatively performed using the rise times and/or decay times of electrical sensor signal 234B in regions 212A, 212B.

FIGS. 9A and 9B are perspective views of valve diagnostic device 100 according to a particular embodiment interacting with electrically-actuated valve 10 to determine a condition of electrically-actuated valve 10. FIGS. 9A and 9B show valve diagnostic device 100 contacting an outer surface of electrically-actuated valve 10, to measure the movement (for example, vibrational movement associated with the contact of moveable part 51 with stationary parts 52A, 52B) of electrically-actuated valve 10. In other embodiments, valve diagnostic device 100 need not contact valve 10 itself and may additionally or alternatively contact the control wire carrying control signal 24 (not shown in FIGS. 9A, 9B).

As shown in FIGS. 9A and 9B, a handle 101 may be provided between valve diagnostic device 100 and cable 103. As discussed above, cable 103 may connect valve diagnostic device 100 to data analyzer 250. Optionally, handle 101 may not be connected to cable 103, and valve diagnostic device 100 may communicate with data analyzer 250 wirelessly.

As will be apparent to those skilled in the art in light of the foregoing disclosure, many alterations and modifications are possible in the practice of this invention without departing from the spirit or scope thereof. Possible alterations and modifications include, without limitation:

Electrical sensor 120 may comprise one or more multiple-element sensors to detect electric or magnetic fields or signals in multiple directions or orientations.

In embodiments where electrical sensor 120 is housed at proximal end 102A of body 102, valve diagnostic device 100 may comprise a second electrical sensor 120' at distal end 102B. The second electrical sensor 120' may measure noise produced by electrically-actuated valve 10 or the surrounding engine, and the noise may be subtracted from the electrical sensor signal 234 measured by the first electrical sensor 120.

In some embodiments, body 102 may be enclosed in a resin cover 105, as shown in FIGS. 9A and 9B. The resin cover may comprise a corrosion-resistant material such as, for example, 2-part epoxy, polyurethane, silicone, casting resin, heat-cured 1-part epoxy, or the like.

Mechanical sensor 110 may measure the movement of fluid through electrically-actuated valve 10 or any other movement-based phenomena associated with the operation of valve 10, instead of or in addition to measuring the contact of movable part 51 with stationary parts 52A, 52B.

In some embodiments, valve diagnostic device 100, 200 may comprise additional types of sensors, such as thermal sensors to measure a temperature of electrically-actuated valve 10.

The example embodiments described herein have several distinct advantages over the prior art, including (without limitation):

Continuously and simultaneously generating mechanical sensor signal 232 and at least one of electrical (capacitive) sensor signal 234A and electrical (inductive) sensor signal 234B allows for time domain analysis of these signals. These signals may have periods on the order of milliseconds, and therefore calculating time delays 208A, 208B, 210A, 210B and/or time constants 212A, 212B may only be possible in real time (or close to real time) when these sensor signals 232, 234A, 234B are obtained simultaneously.

Housing both mechanical sensor 110 and electrical sensors 120A, 120B on body 102 allows a user to measure different signals emitted by electrically-actuated valve 10 without having to turn off the surrounding engine or swap different parts in and out.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors (e.g. processor 100 and/or any other processors described herein) configured by the provision of software (which may optionally comprise "firmware") capable of executing on the data processors, special purpose computers or data processors that are specifically programmed, configured, or constructed to perform one or more steps in a method and/or to provide the functionality as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods and/or provide functionality as described herein by executing software instructions in a program memory accessible to the processors.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, media players, PIDs and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, network PCs, mini-computers, mainframe computers, and the like.

Where a component (e.g. an isolator, actuator, assembly, fastener, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for ascertaining an operational status of an electrically-actuated valve, the system comprising:
   a handheld portable valve-diagnostic device, the handheld portable valve-diagnostic device comprising:
      a body embodied separately from the electrically-actuated valve, the body positionable at any one of a plurality of locations proximate to the electrically-actuated valve and removable from the any one of the plurality of locations proximate to the electrically-actuated valve;
      a first sensor for detecting movement of a movable part of the electrically-actuated valve relative to a stationary part of the electrically-actuated valve and outputting a first sensor signal based on the detected movement while the body is handheld at any one of the plurality of locations proximate to the electrically-actuated valve; and
      a second sensor for detecting an electric and/or magnetic field associated with the operation of an electrical component of the electrically-actuated valve and outputting a second sensor signal based on the detected electric and/or magnetic field while the body is handheld at any one of the plurality of locations proximate to the electrically-actuated valve;
      wherein the first sensor and the second sensor are housed in or on the body; and
   a data analyzer connected to the valve-diagnostic device to receive the first sensor signal and the second sensor signal, the data analyzer configured to:
      select one of the first sensor signal and the second sensor signal as a timing reference for synchronizing the first sensor signal and the second sensor signal;
      synchronize the first sensor signal and the second sensor signal to the timing reference; and
      display an output based on the synchronized first sensor signal and second sensor signal.

2. A system according to claim 1 comprising a third sensor for detecting a second electrical characteristic associated with the operation of the electrically-actuated valve and outputting a third sensor signal based on the detected second electrical characteristic and wherein the data analyzer is connected to receive the third sensor signal.

3. A system according to claim 2 where the third sensor is sensitive to the second electrical characteristic associated with a drive signal in an actuator mechanism of the electrically-actuated valve, the actuator mechanism applying force to the movable part.

4. A system according to claim 3 wherein the third sensor comprises a magnetic field sensor.

5. A system according to claim 3 wherein the data analyzer is configured to determine one or both of a rise time of an exponential rise of the third sensor signal and a decay time of an exponential decay of the third sensor signal and to determine whether the electrically-actuated valve is in a fail state based on one or both of the rise time and the decay time.

6. A system according to claim 3 wherein the data analyzer is configured to determine one or both of a time constant of an exponential rise of the third sensor signal and a time constant of an exponential decay of the third sensor signal and determine whether the electrically-actuated valve is in a fail state based on one or both of the determined time constants.

7. A system according to claim 2 wherein the electric and/or magnetic field is associated with a control signal received at the electrically-actuated valve, and the second electrical characteristic is associated with an electromagnetic response of the electrically-actuated valve to the control signal.

8. A system according to claim 1 where the electrically-actuated valve is an automotive component.

9. A system according to claim 8 where the electrically-actuated valve is an automotive fuel injector.

10. A method for ascertaining an operational status of an electrically-actuated valve, the method comprising:
    providing a handheld portable valve-diagnostic device comprising:
        a body embodied separately from the electrically-actuated valve, the body positionable at any one of a plurality of locations proximate to the electrically-actuated valve and removable from the location proximate to the electrically-actuated valve; a first sensor for detecting movement of a movable part of the electrically-actuated valve relative to a stationary part of the electrically-actuated valve and outputting a first sensor signal based on the detected movement; and a second sensor for detecting an electric and/or magnetic field associated with the operation of an electrical component of the electrically-actuated valve and outputting a second sensor signal based on the detected electric and/or magnetic field; the first sensor and the second sensor housed in or on the body;
    measuring the first sensor signal while the handheld valve-diagnostic device is handheld at one of the one of a plurality of locations proximate to the electrically-actuated valve;
    measuring the second sensor signal while the handheld valve-diagnostic device is handheld at one of the one of a plurality of locations proximate to the electrically-actuated valve;
    selecting one of the first sensor signal and the second sensor signal as a timing reference for synchronizing the first sensor signal and the second sensor signal;
    synchronizing the first sensor signal and the second sensor signal to the timing reference;
    receiving, at a data analyzer connected to the valve-diagnostic device, the first sensor signal and the second sensor signal; and
    displaying, by the data analyzer, an output based on the first sensor signal and the second sensor signal, the output useable to ascertain the operational status of the electrically-actuated valve.

11. A method according to claim 10 where the electrically-actuated valve is an automotive component.

12. A method according to claim 11 where the electrically-actuated valve is an automotive fuel injector.

* * * * *